United States Patent
Liu et al.

(10) Patent No.: US 11,510,229 B2
(45) Date of Patent: Nov. 22, 2022

(54) UPLINK TRANSMISSION METHOD AND TERMINAL

(71) Applicant: Huawei Technologies Co., Ltd., Shenzhen (CN)

(72) Inventors: Yun Liu, Shenzhen (CN); Jian Wang, Beijing (CN); Da Wang, Shenzhen (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 185 days.

(21) Appl. No.: 16/763,402

(22) PCT Filed: Nov. 13, 2018

(86) PCT No.: PCT/CN2018/115228
§ 371 (c)(1),
(2) Date: May 12, 2020

(87) PCT Pub. No.: WO2019/091488
PCT Pub. Date: May 16, 2019

(65) Prior Publication Data
US 2021/0068130 A1    Mar. 4, 2021

(30) Foreign Application Priority Data
Nov. 13, 2017 (CN) .......................... 201711116323.7

(51) Int. Cl.
*H04W 72/12* (2009.01)
*H04W 72/04* (2009.01)
(Continued)

(52) U.S. Cl.
CPC ........ *H04W 72/1268* (2013.01); *H04B 1/713* (2013.01); *H04W 52/146* (2013.01);
(Continued)

(58) Field of Classification Search
None
See application file for complete search history.

(56) References Cited

U.S. PATENT DOCUMENTS

2014/0219126 A1* 8/2014 Li .......................... H04W 24/08
370/252
2015/0358924 A1* 12/2015 Papasakellariou .........................
H04W 72/0473
370/329
(Continued)

FOREIGN PATENT DOCUMENTS

CN 101779392 A 7/2010
CN 102427396 A 4/2012
(Continued)

*Primary Examiner* — Steve R Young
(74) *Attorney, Agent, or Firm* — Conley Rose, P.C.

(57) ABSTRACT

An uplink transmission method and a terminal applied to the field of communications technologies to resolve a signal transmission problem that arises when a short-duration physical uplink control channel carrying only a scheduling request (SR) collides with another uplink channel on a same time domain resource. The method includes transmitting a scheduling request on a first uplink channel using a first time domain resource a first transmit power, where the first uplink channel comprises a first time domain resource and transmitting information on a second uplink channel using a second transmit power, where the second uplink channel comprises the first time domain resource, and where the first time domain resource represents some or all time domain resources in the second uplink channel.

20 Claims, 17 Drawing Sheets

(51) Int. Cl.
*H04W 52/14* (2009.01)
*H04B 1/713* (2011.01)

(52) U.S. Cl.
CPC ... *H04W 72/0413* (2013.01); *H04W 72/0446* (2013.01); *H04W 72/0453* (2013.01); *H04W 72/1257* (2013.01)

(56) References Cited

U.S. PATENT DOCUMENTS

| | | | |
|---|---|---|---|
| 2016/0020929 A1* | 1/2016 | Yamazaki | H04J 11/00 375/300 |
| 2017/0164360 A1 | 6/2017 | Kim et al. | |
| 2018/0077651 A1* | 3/2018 | Nory | H04W 52/146 |
| 2018/0279229 A1* | 9/2018 | Dinan | H04W 52/146 |
| 2020/0015218 A1* | 1/2020 | Lee | H04L 5/0044 |

FOREIGN PATENT DOCUMENTS

| | | |
|---|---|---|
| CN | 102469466 A | 5/2012 |
| CN | 106358296 A | 1/2017 |
| CN | 107241802 A | 10/2017 |
| EP | 2922358 B1 | 5/2019 |
| WO | 2017172447 A1 | 10/2017 |
| WO | 2017172452 A1 | 10/2017 |
| WO | 2017172490 A1 | 10/2017 |

\* cited by examiner

UPLINK TRANSMISSION METHOD AND TERMINAL

CROSS-REFERENCE TO RELATED APPLICATIONS

This application is a U.S. National Stage of International Patent Application No. PCT/CN2018/115228 filed on Nov. 13, 2018, which claims priority to Chinese Patent Application No. 201711116323.7 filed on Nov. 13, 2017, both of which are hereby incorporated by reference in their entireties.

TECHNICAL FIELD

This application relates to the field of communications technologies, and in particular, to an uplink transmission method and a terminal.

BACKGROUND

In long term evolution (Long Term Evolution. LTE), when user equipment (user equipment, UE) has an uplink transmission requirement, the UE sends a scheduling request (Scheduling Request, SR) to an eNodeB, to notify the eNodeB that the UE needs to transmit uplink data. When the eNodeB receives the SR from the UE, the eNodeB sends downlink control signaling to the UE at an appropriate time, and notifies the UE of a resource that is allocated to the UE for uplink transmission. In LTE, the SR may be sent in two manners. One manner is: The SR is transmitted on an SR resource periodically allocated by the eNodeB. The other manner is: When the UE feeds back other uplink control information to the eNodeB, the SR and the other uplink control information are jointly encoded and then transmitted.

In LTE, a physical uplink control channel (physical uplink control channel, PUCCH) is a long-duration PUCCH. When a period of the SR is comparatively long, the SR alone may be carried on the long-duration PUCCH, or the SR and the other uplink control information may be jointly encoded and then carried on the long-duration PUCCH. The long-duration PUCCH occupies 4 to 14 consecutive orthogonal frequency division multiplexing (Orthogonal Frequency Division Multiplexing, OFDM) symbols, and a frequency hopping transmission manner is used.

In 5G, when a period of the SR is comparatively short, and the SR and the other uplink control information are jointly encoded and then transmitted through the long-duration PUCCH, a transmission requirement of the SR for a comparatively short delay cannot be supported. Therefore, there is a short-duration PUCCH in 5G, and the SR may be carried on the short-duration PUCCH, or the SR and the other uplink control information are jointly encoded and then carried on the short-duration PUCCH. The short-duration PUCCH occupies one or two OFDM symbols, and a frequency division multiplexing transmission manner is used.

However, when the period of the SR may be flexibly configured, the short-duration PUCCH carrying only the SR may be transmitted in any symbol. Consequently, the short-duration PUCCH collides with another uplink channel on a same time domain resource. In other words, there are both an SR transmission requirement and another uplink channel transmission requirement in one symbol. In this case, no specific solution is provided in the prior art for a signal transmission problem that arises in a time period of collision.

SUMMARY

This application provides an uplink control information transmission method and an apparatus, to resolve a signal transmission problem that arises when a short-duration physical uplink control channel carrying only an SR collides with another uplink channel on a same time domain resource.

According to a first aspect, this application provides an uplink transmission method, where the method includes: transmitting, by a terminal, a first uplink channel on a first time domain resource by using a first transmit power, and transmitting, by the terminal, a second uplink channel on the first time domain resource by using a second transmit power, where the first uplink channel occupies the first time domain resource to transmit a scheduling request SR, and the first time domain resource is the same as some time domain resources occupied by the second uplink channel, or the first time domain resource is the same as all time domain resources occupied by the second uplink channel.

In a possible design, a resource corresponding to the first time domain resource includes one resource element or at least two consecutive resource elements.

In a possible design, if the second uplink channel is a physical uplink shared channel, when the first time domain resource is the same as a time domain resource used for carrying the $1^{st}$ demodulation reference signal DMRS on the physical uplink shared channel, the first transmit power is not less than a transmit power required for the SR, and the second transmit power is a difference between a total transmit power of the terminal on the first time domain resource and the first transmit power.

In a possible design, if the second uplink channel is a physical uplink shared channel, when the first time domain resource is the same as a time domain resource used for carrying the $2^{nd}$ DMRS on the physical uplink shared channel, the second transmit power is the same as a transmit power for the $1^{st}$ DMRS, and the first transmit power is a difference between a total transmit power of the terminal on the first time domain resource and the second transmit power.

In a possible design, if the second uplink channel is a physical uplink shared channel, when the first time domain resource is the same as a time domain resource used for carrying data on the physical uplink shared channel, and a phase tracking reference signal PT-RS is also carried on the time domain resource used for carrying the data, the first transmit power is not less than a transmit power required for the SR, and the second transmit power is a difference between a total transmit power of the terminal on the first time domain resource and the first transmit power.

In a possible design, if the second uplink channel is a physical uplink shared channel, when the first time domain resource is the same as a time domain resource used for carrying data on the physical uplink shared channel, and no PT-RS is carried on the time domain resource used for carrying the data, the second transmit power is the same as a transmit power on a time domain resource used for carrying a DMRS on the physical uplink shared channel, and the first transmit power is a difference between a total transmit power of the terminal on the first time domain resource and the second transmit power.

In a possible design, if both the first uplink channel and the second uplink channel are physical uplink control channels, when an orthogonal cover code OCC is used for the second uplink signal, and the first time domain resource is the same as a start time domain resource used for the second uplink channel or a start time domain resource used for the second uplink channel in frequency hopping, the first transmit power is not less than the transmit power required for the SR, and the second transmit power is the difference between the total transmit power of the terminal on the first time domain resource and the first transmit power.

In a possible design, if both the first uplink channel and the second uplink channel are physical uplink control channels, when the OCC is used for the second uplink signal, and the first time domain resource is the same as a time domain resource after a start time domain resource used for the second uplink channel or a time domain resource after a start time domain resource used for the second uplink channel in frequency hopping, the second transmit power is the same as a transmit power of the terminal on the start time domain resource, and the first transmit power is the difference between the total transmit power of the terminal on the first time domain resource and the second transmit power.

In a possible design, if both the first uplink channel and the second uplink channel are physical uplink control channels, when the OCC is not used for the second uplink signal, the first transmit power is not less than the transmit power required for the SR, and the second transmit power is the difference between the total transmit power of the terminal on the first time domain resource and the first transmit power.

In a possible design, if both the first uplink channel and the second uplink channel are physical uplink control channels, and the second uplink channel is transmitted in a frequency hopping manner, the first transmit power is not less than a transmit power required for the first uplink channel.

In a possible design, if both the first uplink channel and the second uplink channel are physical uplink control channels, and the second uplink channel is transmitted in a frequency hopping manner, the second transmit power is the difference between the total transmit power of the terminal on the first time domain resource and the first transmit power.

In a possible design, if both the first uplink channel and the second uplink channel are physical uplink control channels, and the second uplink channel is transmitted in a frequency hopping manner, the second transmit power is not less than a transmit power required for the second uplink channel, and the first transmit power is the difference between the total transmit power of the terminal on the first time domain resource and the second transmit power.

In a possible design, if both the first uplink channel and the second uplink channel are physical uplink control channels, and the second uplink channel is transmitted in a frequency hopping manner, the first transmit power is equal to the second transmit power.

In a possible design, if both the first uplink channel and the second uplink channel are physical uplink control channels, and the second uplink channel is transmitted in a frequency hopping manner, the first transmit power and the second transmit power are obtained by allocating the total power based on a ratio of an information amount of the SR to an information amount of uplink control information carried on the second uplink channel.

In a possible design, if both the first uplink channel and the second uplink channel are physical uplink control channels, and the orthogonal cover code OCC is used for the second uplink channel, when the first time domain resource is the same as the $1^{st}$ time domain resource used for the second uplink channel, the first transmit power is not less than the transmit power required for the first uplink channel, and the second transmit power is the difference between the total transmit power of the terminal on the first time domain resource and the first transmit power; or the second transmit power is not less than the transmit power required for the second uplink channel, and the first transmit power is the difference between the total transmit power of the terminal on the first time domain resource and the second transmit power.

In a possible design, if both the first uplink channel and the second uplink channel are physical uplink control channels, and the orthogonal cover code OCC is used for the second uplink channel, when the first time domain resource is the same as a time domain resource that is after the $1^{st}$ time domain resource and that is used for the second uplink channel, the second transmit power is the same as a transmit power on the $1^{st}$ time domain resource used for the second uplink channel, and the first transmit power is the difference between the total transmit power of the terminal on the first time domain resource and the second transmit power.

In a possible design, if the second transmit power is less than the transmit power required for the second uplink channel, the terminal transmits the SR on the first time domain resource; or if the first transmit power is less than the transmit power required for the first uplink channel, the terminal transmits the second uplink channel on the first time domain resource.

In a possible design, after the SR is transmitted, the method further includes: if time domain resources on which the second uplink channel is not transmitted or has been transmitted include time domain resources respectively used for carrying the DMRS and the uplink control information, the terminal transmits the second uplink channel; or if time domain resources on which the second uplink channel is not transmitted or has been transmitted time domain resource do not include time domain resources used for carrying the DMRS and the uplink control information, the transmit power for the second uplink channel is 0.

In a possible design, a transmit power of the terminal on a time domain resource in the time domain resources occupied by the second uplink channel other than the first time domain resource is the same as the second transmit power, or proportionally increases relative to the second transmit power.

According to a second aspect, this application provides an uplink transmission method, where the method includes: sending, by a terminal, information by using a first time domain resource and a first frequency domain resource, and sending, by the terminal, a scheduling request SR by using a second time domain resource and a second frequency domain resource, where the information and the SR are carried on a physical uplink shared channel PUSCH, the information includes a demodulation reference signal DMRS and data, and all time domain resources of the second time domain resource are the same as all or some time domain resources of the first time domain resource, or some time domain resources of the second time domain resource are the same as all or some time domain resources of the first time domain resource.

In a possible design, all frequency domain resources of the second frequency domain resource are the same as all or some frequency domain resources of the first frequency domain resource, or some frequency domain resources of the second frequency domain resource are the same as all or some frequency domain resources of the first frequency domain resource.

In a possible design, when a time domain resource occupied by the DMRS is the same as a time domain resource occupied by the SR, on the same time domain resource occupied by the DMRS and the SR, the terminal sends the DMRS by using a first sequence, and the terminal sends the SR by using a second sequence, where the first sequence is different from the second sequence.

In a possible design, on the same time domain resource occupied by the DMRS and the SR, the terminal sends the DMRS by using a first transmit power, and the terminal sends the SR by using a second transmit power.

In a possible design, the method further includes: when the terminal does not use the second time domain resource and the second frequency domain resource to send the SR, the second transmit power is 0, and the first transmit power is not less than a transmit power required for the DMRS.

In a possible design, there are two DMRSs; and when the second time domain resource is the same as a time domain resource occupied by the $1^{st}$ DMRS, the second transmit power is not less than a transmit power required for transmitting the SR, and the first transmit power is a difference between a total transmit power of the terminal on the second time domain resource and the second transmit power; or when the second time domain resource is the same as a time domain resource occupied by the $2^{nd}$ DMRS, the first transmit power is the same as a transmit power for the $1^{st}$DMRS, and the second transmit power is a difference between a total transmit power of the terminal on the second time domain resource and the first transmit power.

In a possible design, when a time domain resource occupied by the data is the same as the time domain resource occupied by the SR, in resources corresponding to the same time domain resource occupied by the data and the SR, a resource occupied by the data is different from a resource occupied by the SR.

In a possible design, a frequency of the resource occupied by the SR is greater than or equal to a minimum frequency of the resource occupied by the data, and a frequency of the resource occupied by the data is less than or equal to a maximum frequency of the resource occupied by the data.

In a possible design, the resource occupied by the SR includes one or more resource groups, and each resource group includes one resource element or at least two consecutive resource elements.

In a possible design, when the resource occupied by the SR includes a plurality of resource groups, there is an interval of at least one resource element between different resource groups.

In a possible design, the adjacent resource groups on a time domain resource are located on different frequency domain resources.

In a possible design, if the information further includes a phase tracking reference signal, at least one of the resource groups is adjacent to a frequency domain resource used for the phase tracking reference signal.

According to a third aspect, this application provides a terminal, including a memory, a transceiver, and a processor. The memory is configured to store an instruction. The processor is configured to execute the instruction stored in the memory, and control the transceiver to receive a signal and send a signal. When the processor executes the instruction stored in the memory, the terminal is configured to perform the method in any one of the first aspect or the possible designs of the first aspect.

Specifically, the processor is configured to transmit a first uplink channel on a first time domain resource by using a first transmit power, and transmit a second uplink channel on the first time domain resource by using a second transmit power, where the first uplink channel occupies the first time domain resource to transmit a scheduling request SR, and the first time domain resource is the same as some time domain resources occupied by the second uplink channel, or the first time domain resource is the same as all time domain resources occupied by the second uplink channel.

In a possible design, the first time domain resource corresponds to one resource element or at least two consecutive resource elements.

In a possible design, if the second uplink channel is a physical uplink shared channel, when the first time domain resource is the same as a time domain resource used for carrying the $1^{st}$ demodulation reference signal DMRS on the physical uplink shared channel, the first transmit power is not less than a transmit power required for the SR, and the second transmit power is a difference between a total transmit power of the terminal on the first time domain resource and the first transmit power.

In a possible design, if the second uplink channel is a physical uplink shared channel, when the first time domain resource is the same as a time domain resource used for carrying the $2^{nd}$ DMRS on the physical uplink shared channel, the second transmit power is the same as a transmit power for the $1^{st}$ DMRS, and the first transmit power is a difference between a total transmit power of the terminal on the first time domain resource and the second transmit power.

In a possible design, if the second uplink channel is a physical uplink shared channel, when the first time domain resource is the same as a time domain resource used for carrying data on the physical uplink shared channel, and a phase tracking reference signal PT-RS is also carried on the time domain resource used for carrying the data, the first transmit power is not less than a transmit power required for the SR, and the second transmit power is a difference between a total transmit power of the terminal on the first time domain resource and the first transmit power.

In a possible design, if the second uplink channel is a physical uplink shared channel, when the first time domain resource is the same as a time domain resource used for carrying data on the physical uplink shared channel, and no PT-RS is carried on the time domain resource used for carrying the data, the second transmit power is the same as a transmit power on a time domain resource used for carrying a DMRS on the physical uplink shared channel, and the first transmit power is a difference between a total transmit power of the terminal on the first time domain resource and the second transmit power.

In a possible design, if both the first uplink channel and the second uplink channel are physical uplink control channels, when an orthogonal cover code OCC is used for the second uplink signal, and the first time domain resource is the same as a start time domain resource used for the second uplink channel or a start time domain resource used for the second uplink channel in frequency hopping, the first transmit power is not less than the transmit power required for the SR, and the second transmit power is the difference between the total transmit power of the terminal on the first time domain resource and the first transmit power.

In a possible design, if both the first uplink channel and the second uplink channel are physical uplink control channels, when the OCC is used for the second uplink signal, and the first time domain resource is the same as a time domain resource after a start time domain resource used for the second uplink channel or a time domain resource after a start time domain resource used for the second uplink channel in frequency hopping, the second transmit power is the same as a transmit power of the terminal on the start time domain resource, and the first transmit power is the difference between the total transmit power of the terminal on the first time domain resource and the second transmit power.

In a possible design, if both the first uplink channel and the second uplink channel are physical uplink control channels, when the OCC is not used for the second uplink signal, the first transmit power is not less than the transmit power required for the SR, and the second transmit power is the difference between the total transmit power of the terminal on the first time domain resource and the first transmit power.

In a possible design, if both the first uplink channel and the second uplink channel are physical uplink control channels, and the second uplink channel is transmitted in a frequency hopping manner, the first transmit power is not less than a transmit power required for the first uplink channel.

In a possible design, if both the first uplink channel and the second uplink channel are physical uplink control channels, and the second uplink channel is transmitted in a frequency hopping manner, the second transmit power is the difference between the total transmit power of the terminal on the first time domain resource and the first transmit power.

In a possible design, if both the first uplink channel and the second uplink channel are physical uplink control channels, and the second uplink channel is transmitted in a frequency hopping manner, the second transmit power is not less than a transmit power required for the second uplink channel, and the first transmit power is the difference between the total transmit power of the terminal on the first time domain resource and the second transmit power.

In a possible design, if both the first uplink channel and the second uplink channel are physical uplink control channels, and the second uplink channel is transmitted in a frequency hopping manner, the first transmit power is equal to the second transmit power.

In a possible design, if both the first uplink channel and the second uplink channel are physical uplink control channels, and the second uplink channel is transmitted in a frequency hopping manner, the first transmit power and the second transmit power are obtained by allocating the total power based on a ratio of an information amount of the SR to an information amount of uplink control information carried on the second uplink channel.

In a possible design, if both the first uplink channel and the second uplink channel are physical uplink control channels, and the orthogonal cover code OCC is used for the second uplink channel, when the first time domain resource is the same as the $1^{st}$ time domain resource used for the second uplink channel, the first transmit power is not less than the transmit power required for the first uplink channel, and the second transmit power is the difference between the total transmit power of the terminal on the first time domain resource and the first transmit power; or the second transmit power is not less than the transmit power required for the second uplink channel, and the first transmit power is the difference between the total transmit power of the terminal on the first time domain resource and the second transmit power.

In a possible design, if both the first uplink channel and the second uplink channel are physical uplink control channels, and the orthogonal cover code OCC is used for the second uplink channel, when the first time domain resource is the same as a time domain resource that is after the $1^{st}$ time domain resource and that is used for the second uplink channel, the second transmit power is the same as a transmit power on the $1^{st}$ time domain resource used for the second uplink channel, and the first transmit power is the difference between the total transmit power of the terminal on the first time domain resource and the second transmit power.

In a possible design, the processor is configured to: if the second transmit power is less than the transmit power required for the second uplink channel, transmit the SR on the first time domain resource; or if the first transmit power is less than the transmit power required for the first uplink channel, transmit the second uplink channel on the first time domain resource.

In a possible design, the processor is further configured to: after the SR is transmitted, if time domain resources on which the second uplink channel is not transmitted or has been transmitted include time domain resources respectively used for carrying the DMRS and the uplink control information, transmit the second uplink channel; or if time domain resources on which the second uplink channel is not transmitted or has been transmitted do not include time domain resources used for carrying the DMRS and the uplink control information, the transmit power for the second uplink channel is 0.

In a possible design, a transmit power of the terminal on a time domain resource in the time domain resources occupied by the second uplink channel other than the first time domain resource is the same as the second transmit power, or proportionally increases relative to the second transmit power.

According to a fourth aspect, this application provides a terminal. The terminal includes a memory, a transceiver, and a processor. The memory is configured to store an instruction. The processor is configured to execute the instruction stored in the memory, and control the transceiver to receive a signal and send a signal. When the processor executes the instruction stored in the memory, the terminal is configured to perform the method in any one of the second aspect or the possible designs of the second aspect.

Specifically, the processor is configured to: send, by using the transceiver, information by using a first time domain resource and a first frequency domain resource, and send, by using the transceiver, a scheduling request SR by using a second time domain resource and a second frequency domain resource, where the information and the SR are carried on a physical uplink shared channel PUSCH, the information includes a demodulation reference signal DMRS and data, and all time domain resources of the second time domain resource are the same as all or some time domain resources of the first time domain resource, or some time domain resources of the second time domain resource are the same as all or some time domain resources of the first time domain resource.

In a possible design, all frequency domain resources of the second frequency domain resource are the same as all or some frequency domain resources of the first frequency domain resource, or some frequency domain resources of the second frequency domain resource are the same as all or some frequency domain resources of the first frequency domain resource.

In a possible design, the processor is configured to: when a time domain resource occupied by the DMRS is the same as a time domain resource occupied by the SR, on the same time domain resource occupied by the DMRS and the SR, send the DMRS by using a first sequence, and send the SR by using a second sequence, where the first sequence is different from the second sequence.

In a possible design, the processor is configured to: on the same time domain resource occupied by the DMRS and the SR send the DMRS by using a first transmit power, and send the SR by using a second transmit power.

In a possible design, when the processor does not use the second time domain resource and the second frequency domain resource to send the SR, the second transmit power is 0, and the first transmit power is not less than a transmit power required for the DMRS.

In a possible design, there are two DMRSs; and when the second time domain resource is the same as a time domain resource occupied by the $1^{st}$ DMRS, the second transmit power is not less than a transmit power required for transmitting the SR, and the first transmit power is a difference between a total transmit power of the terminal on the second time domain resource and the second transmit power: or when the second time domain resource is the same as a time domain resource occupied by the $2^{nd}$ DMRS, the first transmit power is the same as a transmit power for the $1^{st}$ DMRS, and the second transmit power is a difference between a total transmit power of the terminal on the second time domain resource and the first transmit power.

In a possible design, when a time domain resource occupied by the data is the same as the time domain resource occupied by the SR, in resources corresponding to the same time domain resource occupied by the data and the SR, a resource occupied by the data is different from a resource occupied by the SR.

In a possible design, a frequency of the resource occupied by the SR is greater than or equal to a minimum frequency of the resource occupied by the data, and a frequency of the resource occupied by the data is less than or equal to a maximum frequency of the resource occupied by the data.

In a possible design, the resource occupied by the SR includes one or more resource groups, and each resource group includes one resource element or at least two consecutive resource elements. The resource occupied by the SR includes a plurality of resource groups, so that SR transmission reliability can be improved.

In a possible design, when the resource occupied by the SR includes a plurality of resource groups, there is an interval of at least one resource element between different resource groups.

In a possible design, the adjacent resource groups on a time domain resource are located on different frequency domain resources. In this way, SR transmission reliability is improved.

In a possible design, if the information further includes a phase tracking reference signal, at least one of the resource groups is adjacent to a frequency domain resource used for the phase tracking reference signal.

According to a fifth aspect, to achieve the foregoing objective, this application provides a circuit system. The circuit system includes a chip or a system on chip that provides a processor function, and the chip or the system on chip is configured on a terminal, so that the terminal implements the method in any one of the first aspect or the possible implementations of the first aspect or the method in any one of the second aspect or the possible implementations of the second aspect.

According to a sixth aspect, to achieve the foregoing objective, this application provides a chip. The chip is connected to a memory, and is configured to read and execute a software program stored in the memory, to implement the method in any one of the first aspect or the possible designs of the first aspect or the method in any one of the second aspect or the possible designs of the second aspect.

DESCRIPTION OF EMBODIMENTS

The following further describes this application in detail with reference to the accompanying drawings.

Figure 1:
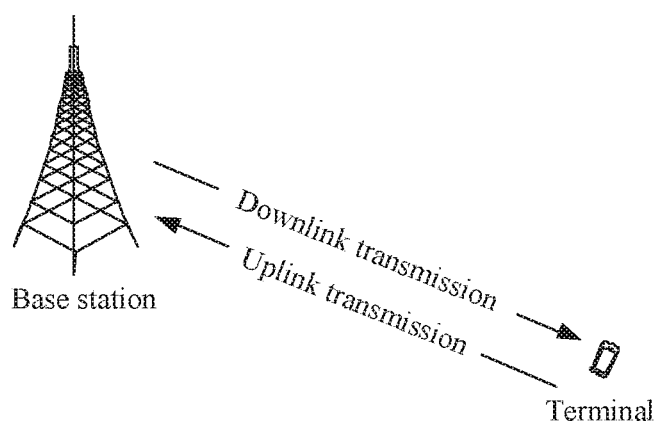
FIG. 1 is a schematic diagram of a system architecture according to an embodiment of this application.

FIG. 1 shows an example of a system architecture to which this application is applicable.

A base station may be a device that can communicate with a terminal. The base station may be any device with a wireless transceiver function, including but not limited to a base station (for example, a NodeB NodeB, an evolved NodeB eNodeB, a NodeB in a fifth generation (the fifth generation, 5G) communications system, a base station or a network device in a future communications system, an access node in a Wi-Fi system, a wireless relay node, and a wireless backhaul node), or the like. Alternatively, the base station may be a radio controller in a cloud radio access network (cloud radio access network, CRAN) scenario. Alternatively, the base station may be a network device on a 5G network or a network device on a future evolved network. Alternatively, the base station may be a wearable device, a vehicle-mounted device, or the like. Alternatively, the base station may be a small cell, a transmission node (transmission reference point, TRP), or the like. Certainly, this is not limited in this application.

The terminal is a device with a wireless transceiver function. The terminal may be deployed on land and includes an indoor or outdoor device, a handheld device, a wearable device, or a vehicle-mounted device, may be deployed on a water surface (for example, a ship), or may be deployed in the air (for example, an airplane, a balloon, or a satellite). The terminal may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), and a wireless terminal in a smart city (smart city), a wireless terminal in a smart home (smart home), or the like. An application scenario is not limited in the embodiments of this application. The terminal may sometimes be referred to as user equipment (user equipment, UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

It should be noted that the terms "system" and "network" may be used interchangeably in the embodiments of the disclosure. "A plurality of" means two or more. In view of this, "a plurality of" may also be understood as "at least two" in the embodiments of the disclosure. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects. In addition, it should be understood that in descriptions of this application, terms such as "first" and "second" are merely used for distinguishing and description, but should not be understood as an indication or implication of relative importance, or should not be understood as an indication or implication of a sequence.

In the following, some terms in this application are explained, to help a person skilled in the art have a better understanding.

A time domain resource in this application is one symbol or more consecutive symbols distributed in time domain.

A frequency domain resource in this application is one or more subcarriers distributed in frequency domain, and a frequency domain resource element in this application is a subcarrier.

A resource element (resource element, RE) in this application is a resource corresponding to one symbol in time domain and one subcarrier in frequency domain.

A symbol described in this application includes but is not limited to an orthogonal frequency division multiplexing (OFDM) symbol, a sparse code multiple access (SCMA) symbol, a symbol, a filtered OFDM (F-OFDM) symbol, and a non-orthogonal multiple access (NOMA) symbol. The symbol may be specifically determined based on an actual situation, and details are not described herein.

A PUCCH in this application is a channel carrying control signaling sent by the terminal to the base station, and the control signaling includes control-related information. For example, the PUCCH is used for replying with an Acknowledgment or a (acknowledge/negative acknowledge (ACK/NACK), transmitting uplink channel state information (CSI), or carrying a scheduling request. The physical uplink control channel is classified into two types. One is a long-duration PUCCH. The long-duration PUCCH occupies four to 14 consecutive OFDM symbols, and is transmitted in a frequency hopping manner. A demodulation reference signal (DMRS) and uplink control information are (UCI) are respectively carried in different symbols, and an orthogonal coverage code may be used for spreading on each frequency hopping part, to increase a capacity. The other is a short-duration PUCCH. The short-duration PUCCH occupies one or two OFDM symbols. On a frequency domain physical resource block (PRB), information may be carried by using a sequence, or a DMRS and uplink control information UCI are transmitted in a frequency division manner by respectively occupying different subcarriers. In one slot, the PUCCH may be transmitted on any location.

An SR in this application is request signaling sent by the terminal to the base station when the terminal has an uplink transmission requirement, to obtain a time-frequency domain resource allocated by the base station. The base station configures, for the terminal, a resource used for transmitting the SR, where the resource is periodically allocated. When the base station receives the SR from the terminal, the base station sends, to the terminal in proper time, downlink control signaling in which allocated resource information is carried, and then the terminal performs uplink transmission on the resource allocated by the base station. In LTE, a scheduling request is carried in two manners. One manner is that the scheduling request is transmitted by the terminal on a resource periodically allocated by the base station. The other manner is that when feeding back other uplink control information, the terminal jointly encodes the SR and the other uplink control information for transmission.

Figure 2:
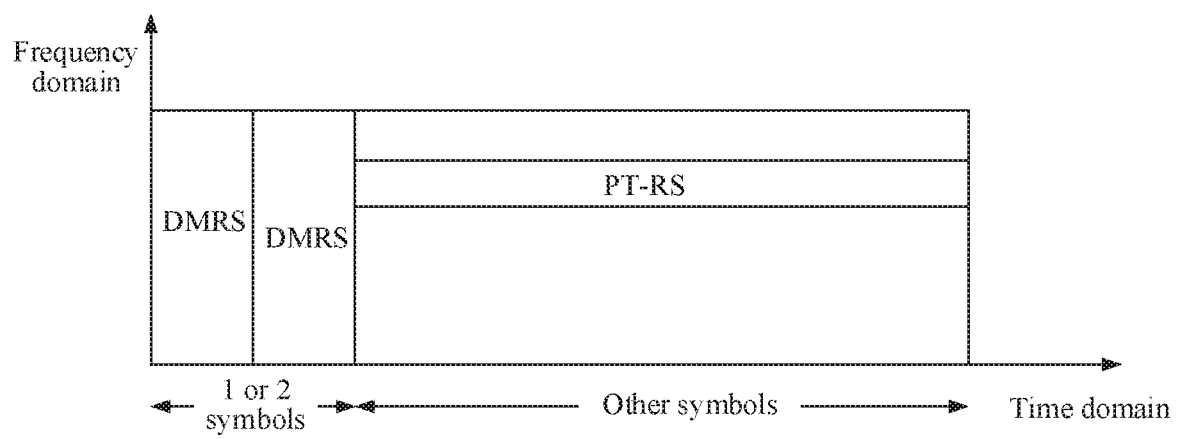
FIG. 2 is a schematic diagram of a PUSCH structure according to an embodiment of this application.

A physical uplink shared channel (Physical uplink shared channel, PUSCH) in this application is a channel used by the terminal to transmit data and some control information. In new radio (New radio, NR), a currently agreed-upon structure of the PUSCH is shown in FIG. 2. A DMRS is carried in one or two start symbols on the PUSCH, to support channel measurement on a plurality of ports. The data or other control information is carried in remaining symbols on the PUSCH. In the remaining symbols, there is a fixed frequency domain resource used for carrying a phase tracking reference signal (phase tracking reference signal, PT-RS). The terminal transmits the same signal in the symbols to detect phase noise. Whether the PT-RS is carried on the PUSCH is preconfigured.

To resolve a signal transmission problem on a time domain resource on which a collision occurs, this application provides an uplink transmission method, mainly including the following steps.

Step 101: A terminal obtains a first transmit power and a second transmit power.

The first transmit power and the second transmit power are respectively powers allocated by the terminal to a first uplink channel and a second uplink channel for transmission on a first time domain resource. A sum of the first transmit power and the second transmit power is equal to a total transmit power of the terminal on the first time domain resource.

The first uplink channel is a PUCCH carrying only an SR. The second uplink channel may be a long-duration PUCCH, or may be a short-duration PUCCH, or may be a PUSCH. However, when the second uplink channel is the short-duration PUCCH, the short-duration PUCCH does not include a short-duration PUCCH carrying only the SR.

The first uplink channel occupies the first time domain resource to transmit the SR.

Optionally, a length of the first time domain resource is a length of one symbol or a length of two symbols, the length of one symbol is a time length occupied by one symbol, and the length of two symbols is a time length occupied by two consecutive symbols. Optionally, the first uplink channel is a short-duration PUCCH. For example, the first uplink channel is a PUCCH with a length of one symbol or a PUCCH with a length of two symbols.

The first time domain resource is the same as some or all time domain resources occupied by the second uplink channel. In other words, the first time domain resource is included in the time domain resources occupied by the second uplink channel.

Step 102: The terminal transmits the first uplink channel on the first time domain resource by using the first transmit power, and the terminal transmits the second uplink channel on the first time domain resource by using the second transmit power.

In step 102, transmitting the second uplink channel on the first time domain resource means that information is transmitted on a resource that is configured for the second uplink channel and that corresponds to the first time domain resource. The information is information that is carried on the second uplink channel on the resource corresponding to the first time domain resource. In step 102, transmitting the first uplink channel on the first time domain resource means that the SR is transmitted on a resource that is allocated to the first uplink channel and that corresponds to the first time domain resource. The resource that is configured for the second uplink channel and that corresponds to the first time domain resource is different from the resource that is configured for the first uplink channel and that corresponds to the first time domain resource.

The resource that is configured for the second uplink channel and that corresponds to the first time domain resource includes one or more resource elements. The resource element that is configured for the second uplink channel and that corresponds to the first time domain resource is preconfigured by a base station, or is preconfigured on the terminal.

The resource that is configured for the first uplink channel and that corresponds to the first time domain resource includes one or more resource elements. The resource that is allocated to the first uplink channel and that corresponds to the first time domain resource is preconfigured by the base station, or is preconfigured on the terminal.

In the foregoing method procedure, the terminal allocates the first transmit power and the second transmit power to the same time domain resource occupied by the first uplink channel and the second uplink channel, so that the first uplink channel and the second uplink channel can be simultaneously transmitted on the same time domain resource. In addition, the configured first transmit power is different from the configured second transmit power based on a transmission characteristic of the same time domain resource in the time domain resources occupied by the second uplink channel. This resolves a prior-art problem that signals cannot be simultaneously transmitted when the short-duration PUCCH carrying only the SR collides with another uplink channel on a same time domain resource.

In an implementation scenario, the second uplink channel is a PUSCH, and a length of the PUSCH is not limited.

In this implementation scenario, a function of the PUSCH is to transmit a DMRS and data. Therefore, based on different cases of the first time domain resource included in time domain resources used for the PUSCH, that the terminal transmits the second uplink channel on the first time domain resource by using the second transmit power in step 102 also includes different cases. For example, if the first time domain resource included in the time domain resources used for the PUSCH occupies only a DMRS symbol, the terminal transmits the DMRS on the first time domain resource by using the second transmit power. If the first time domain resource included in the time domain resources used for the PUSCH occupies only a data symbol, the terminal transmits the data on the first time domain resource by using the second transmit power. If the first time domain resource included in the time domain resources used for the PUSCH occupies both a DMRS symbol and a data symbol, the terminal transmits both the DMRS and the data on the first time domain resource by using the second transmit power.

In this implementation scenario, based on the different cases of the first time domain resource included in the time domain resources used for the PUSCH, the first transmit power and the second transmit power also have different configurations.

Optionally, when the first time domain resource occupied by the first uplink channel is the same as a time domain resource used for carrying the $1^{st}$ DMRS on the PUSCH, the first transmit power is not less than a transmit power required for the SR, and the second transmit power is a difference between the total transmit power of the terminal on the first time domain resource and the first transmit power.

For example, the first uplink channel occupies a time domain resource with a length of one symbol to transmit the SR, and the PUSCH occupies a time domain resource with a length of one symbol or two symbols to transmit the DMRS. When the symbol for carrying the SR on the first uplink channel is the same as the $1^{st}$ symbol for carrying the DMRS on the PUSCH in time domain, and when the transmit power required for the DMRS is P0, the transmit power required for the SR is P1, and a total transmit power of the terminal in each symbol is P the terminal configures the total transmit power P in the same symbol as the first transmit power P1 and the second transmit power (P-P1). In this case. P1 can meet at least a transmission requirement of the SR carried on the first uplink channel. The second transmit power (P-P1) may meet a transmission requirement of the DMRS carried on the PUSCH, or may not meet a transmission requirement of the DMRS carried on the PUSCH.

Optionally, when the first time domain resource occupied by the first uplink channel is the same as a time domain resource used for carrying the $2^{nd}$ DMRS on the PUSCH, the second transmit power is the same as a transmit power for the $1^{st}$ DMRS, and the first transmit power is a difference between the total transmit power of the terminal on the first time domain resource and the second transmit power.

For example, the first uplink channel occupies a time domain resource with a length of one symbol to transmit the SR, and the PUSCH occupies a time domain resource with a length of two symbols to transmit the DMRS. When the symbol for carrying the SR on the first uplink channel is the same as the $2^{nd}$ symbol for carrying the DMRS on the PUSCH in time domain, and when a transmit power required for the DMRS is P0, a transmit power required for the SR is P1, and a total transmit power of the terminal in each symbol is P, the terminal configures the total transmit power P in the same symbol as the first transmit power (P-P0) and the second transmit power P0. In this case, P0 is a transmit power in the $1^{st}$ symbol for carrying the DMRS on the PUSCH, and P0 can meet at least a transmission requirement of the DMRS carried on the PUSCH. The first transmit power (P-P0) may meet a transmission requirement of the SR carried on the first uplink channel, or may not meet a transmission requirement of the SR carried on the first uplink channel.

Optionally, when the first time domain resource occupied by the first uplink channel is the same as a time domain resource used for carrying the data on the PUSCH, and a PT-RS is carried on the time domain resource used for carrying the data, the first transmit power is not less than a transmit power required for the SR, and the second transmit power is a difference between the total transmit power of the terminal on the first time domain resource and the first transmit power. The base station obtains variations of transmit powers in different data symbols by comparing variations of transmit powers on a frequency domain resource occupied by PT-RSs in the different data symbols.

For example, the first uplink channel occupies a time domain resource with a length of one symbol to transmit the SR, and the PUSCH occupies a time domain resource with a length of 2 to 13 symbols to transmit the data. When the symbol for carrying the SR on the first uplink channel overlaps with one of the symbols for carrying the data on the PUSCH in time domain, and when a transmit power required for the DMRS is P0, the transmit power required for the SR is P1, and a total transmit power of the terminal in each symbol is P, if the PT-RS is also carried on the time domain resource that has the length of 2 to 13 symbols and that is occupied by the PUSCH, the terminal configures the total transmit power P in the overlapping symbol as the first transmit power P1 and the second transmit power (P-P1). The second transmit power (P-P1) may meet a transmission requirement of the DMRS carried on the PUSCH, or may not meet a transmission requirement of the DMRS carried on the PUSCH.

Optionally, when the first time domain resource occupied by the first uplink channel is the same as a time domain resource used for carrying the data on the PUSCH, and no PT-RS is carried on the time domain resource used for carrying the data, the second transmit power is the same as a transmit power on a time domain resource used for carrying the DMRS on the PUSCH, and the first transmit power is a difference between the total transmit power of the terminal on the first time domain resource and the second transmit power. In this way, because a transmit power in a data symbol is the same as the transmit power for the DMRS, no decoding error occurs on the base station side regardless of whether the base station has a capability of identifying a transmit power in a symbol. This can avoid a decoding error caused on the base station side due to different transmit powers in different symbols on the PUSCH.

For example, the first uplink channel occupies a time domain resource with a length of one symbol to transmit the SR, and the PUSCH occupies a time domain resource with a length of 1 to 13 symbols to transmit the data. When the symbol for carrying the SR on the first uplink channel overlaps with one of the symbols for carrying the data on the PUSCH in time domain, and when the transmit power required for the DMRS is P0, a transmit power required for the SR is P1, and a total transmit power of the terminal in each symbol is P, if no PT-RS is carried on the time domain resource that has the length of 1 to 13 symbols and that is occupied by the PUSCH, the terminal configures the total transmit power P in the overlapping symbol as the first transmit power (P-P0) and the second transmit power P0. The first transmit power (P-P0) may meet a transmission requirement of the SR carried on the first uplink channel, or may not meet a transmission requirement of the SR carried on the first uplink channel.

In a 5G system, a symbol length of a time domain resource occupied by the PUSCH is not limited, and the length may be long duration or short duration. The symbol length of the time domain resource occupied by the PUSCH may be preconfigured on the terminal, or may be indicated by the base station to the terminal. In the 5G system, an SR period is relatively short, and may be flexibly configured based on different services. The SR period includes a length of at least one symbol, and the SR period may be preconfigured on the terminal, or may be indicated by the base station to the terminal.

In the 5G system, because both the length of the time domain resource occupied by the PUSCH and the SR period may be flexibly configured, the symbol for carrying the SR on the first uplink channel may overlap with only a symbol for carrying the DMRS on the PUSCH, the symbol for carrying the SR on the first uplink channel may overlap with only a symbol for carrying the data on the PUSCH, or the symbol for carrying the SR on the first uplink channel may overlap with symbols for carrying both the DMRS and the data on the PUSCH. Therefore, in a specific implementation scenario, a manner of configuring the first transmit power and the second transmit power may be one of the foregoing several optional configuration manners, or may be a combination of any two or three of the foregoing several optional configuration manners.

For the foregoing several optional configuration manners, if the symbol for carrying the SR on the first uplink channel overlaps with the symbol for carrying the DMRS on the PUSCH in time domain, and based on the SR period, a data symbol after the DMRS symbol on the PUSCH does not overlap with a symbol for carrying the SR on the first uplink channel in a next period, a transmit power for data carried on the PUSCH in the data symbol after the DMRS symbol is configured as follows:

Optionally, the transmit power for the data carried in the data symbol is the same as the second transmit power.

Figure 3:
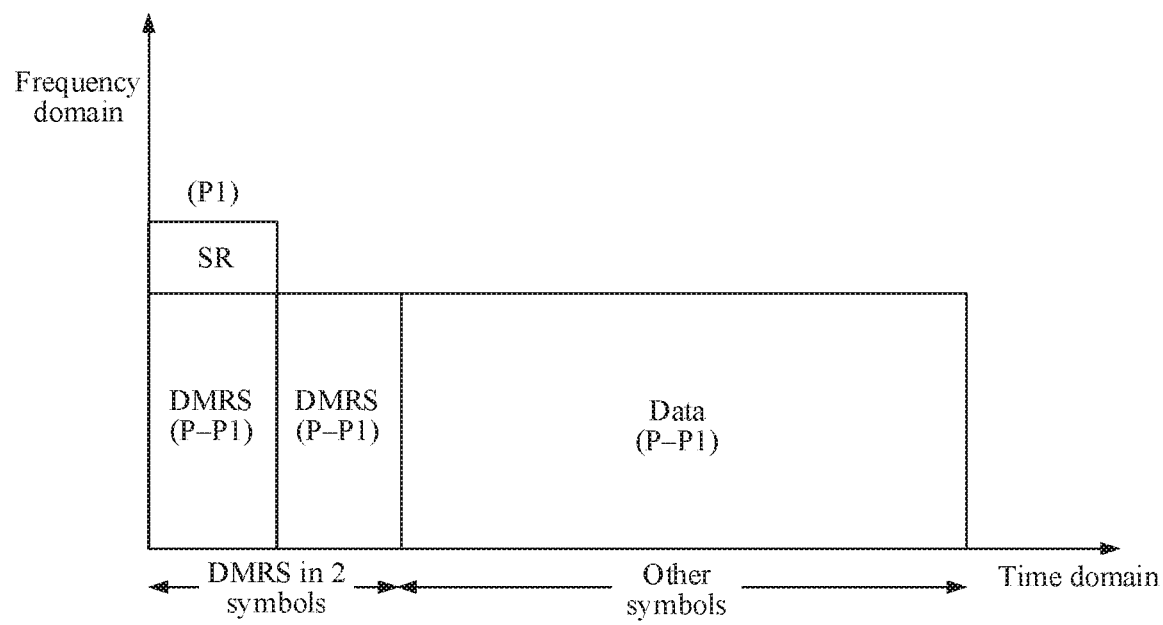
FIG. 3(1) and FIG. 3(2) each are a schematic diagram of power allocation in different time-domain symbols on a PUSCH according to an embodiment of this application.
Figure 3:
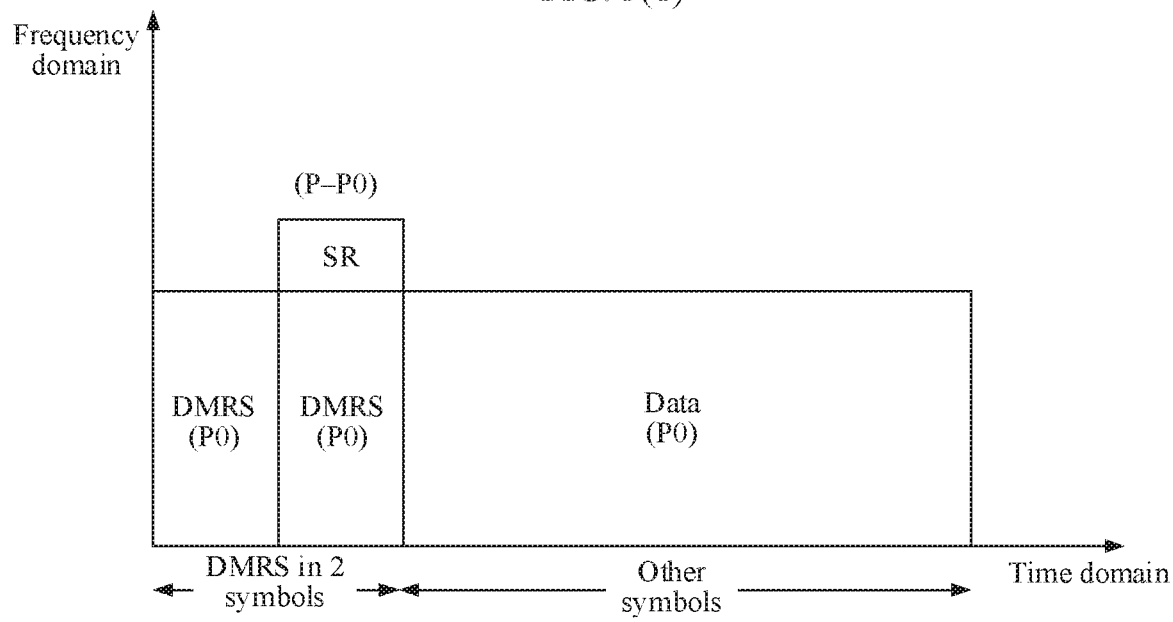

For example, if the transmit power required for the DMRS is P0, the transmit power required for the SR is P1, and the total transmit power of the terminal in each symbol is P. As shown in FIG. 3(1), when the PUCCH carrying the SR collides with the PUSCH in the $1^{st}$ DMRS symbol, the transmit power allocated to the SR may be P1, the transmit power allocated to the DMRS may be P-P1, and the transmit power for the data carried in the data symbol may be P-P1. As shown in FIG. 3(2), when the PUCCH carrying the SR collides with the PUSCH in the $2^{nd}$ DMRS symbol, a transmit power for the $1^{st}$ DMRS may be P0, the transmit power allocated to the SR may be P-P0, the transmit power allocated to the DMRS may be P0, and the transmit power for the data carried in the data symbol may be P0.

Optionally, if a PT-RS is carried on the PUSCH in a data symbol after the overlapping symbol, a transmit power for data carried in each data symbol increases relative to the second transmit power based on a specified proportion. The base station may either identify an increment in the transmit power in the data symbol, or obtain an increment in the transmit power in the data symbol by comparing variations of transmit powers for the PT-RS and the DMRS on a same frequency domain resource.

Figure 4:
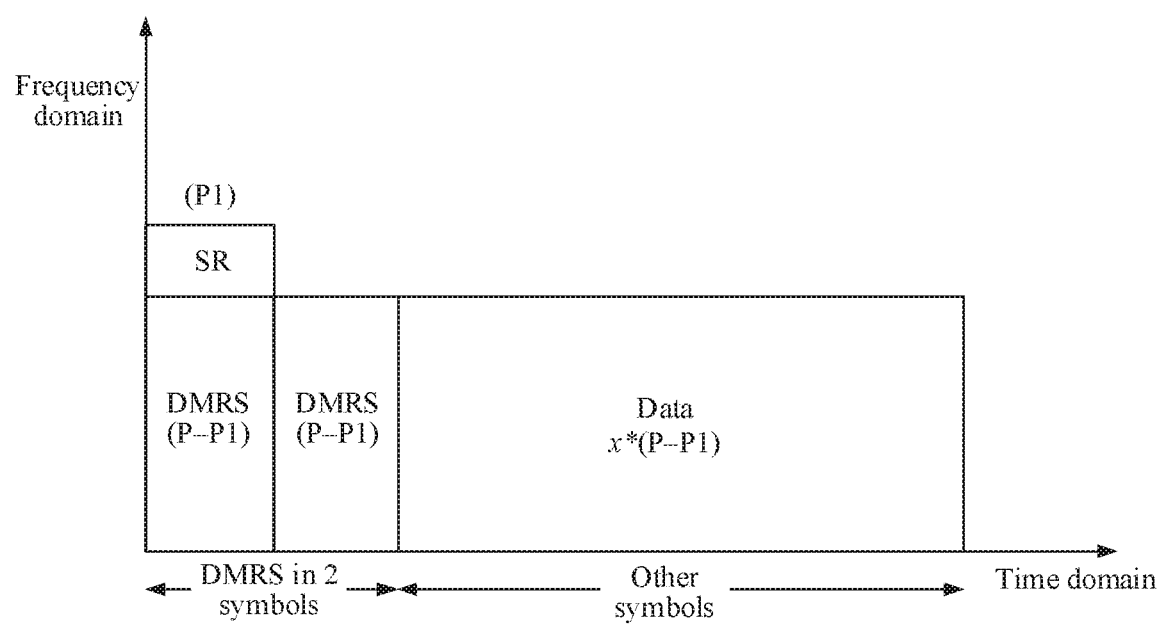
FIG. 4(1) and FIG. 4(2) each are a schematic diagram of power allocation in different time-domain symbols on a PUSCH according to an embodiment of this application.
Figure 4:
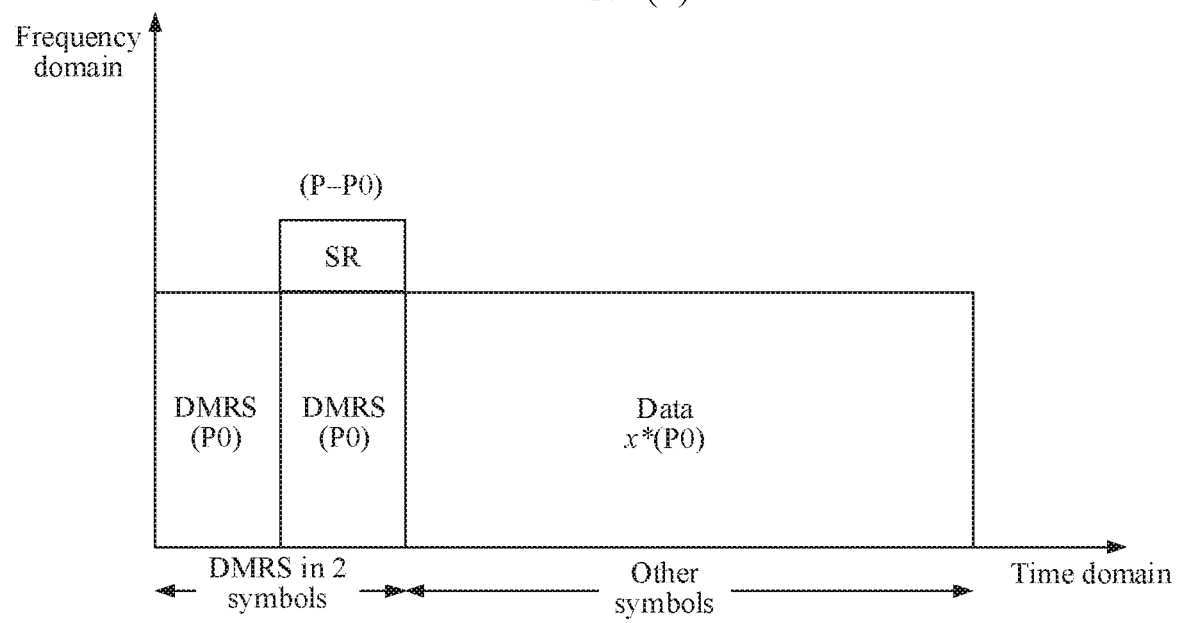

For example, if the transmit power required for the DMRS is P0, the transmit power required for the SR is P1, and the total transmit power of the terminal in each symbol is P. As shown in FIG. 4(1), when the PUCCH carrying the SR collides with the PUSCH in the $1^{st}$ DMRS symbol, the transmit power allocated to the SR may be P1, the transmit power allocated to the DMRS may be P-P1, and the transmit power for the data carried in the data symbol may be x*(P-P1), where x is greater than or equal to 1, and x is an integer or not an integer. As shown in FIG. 4(2), when the PUCCH carrying the SR collides with the PUSCH in the $2^{nd}$ DMRS symbol, a transmit power for the $1^{st}$ DMRS may be P0, the transmit power allocated to the SR may be P-P0, the transmit power allocated to the DMRS may be P0, and the transmit power for the data carried in the data symbol may be x*P0.

Optionally, if no PT-RS is carried in a data symbol after the overlapping symbol, when the base station cannot identify a variation of the transmit power for the PUSCH in the data symbol, the transmit power for the data carried in the data symbol keeps the same as the second transmit power. For a specific example, refer to FIG. 3(1) or FIG. 3(2).

For the foregoing several optional configuration manners, if the symbol for carrying the SR on the first uplink channel overlaps with the symbol for carrying the DMRS on the PUSCH in time domain, and based on the SR period, a data symbol after the DMRS symbol on the PUSCH may overlap with a symbol for carrying the SR on the first uplink channel in a next period, a transmit power for data carried on the PUSCH in the data symbol after the DMRS symbol is configured as follows:

Optionally, when the base station cannot identify the variation of the transmit power for the PUSCH in the data symbol, if a PT-RS is carried in the data symbol after the overlapping symbol, a transmit power for carrying the SR on the first uplink channel in a next period is the transmit power required for the SR, a transmit power in the same data symbol is a difference between a total transmit power of the terminal in the data symbol and the transmit power for carrying the SR on the first uplink channel in the next period, and a transmit power for data in a remaining data symbol may be the same as the transmit power for the DMRS, or may proportionally increase relative to the transmit power for the DMRS. The base station obtains variations of transmit powers in different data symbols by comparing variations of transmit powers on a frequency domain resource occupied by PT-RSs in the different data symbols.

Figure 5:
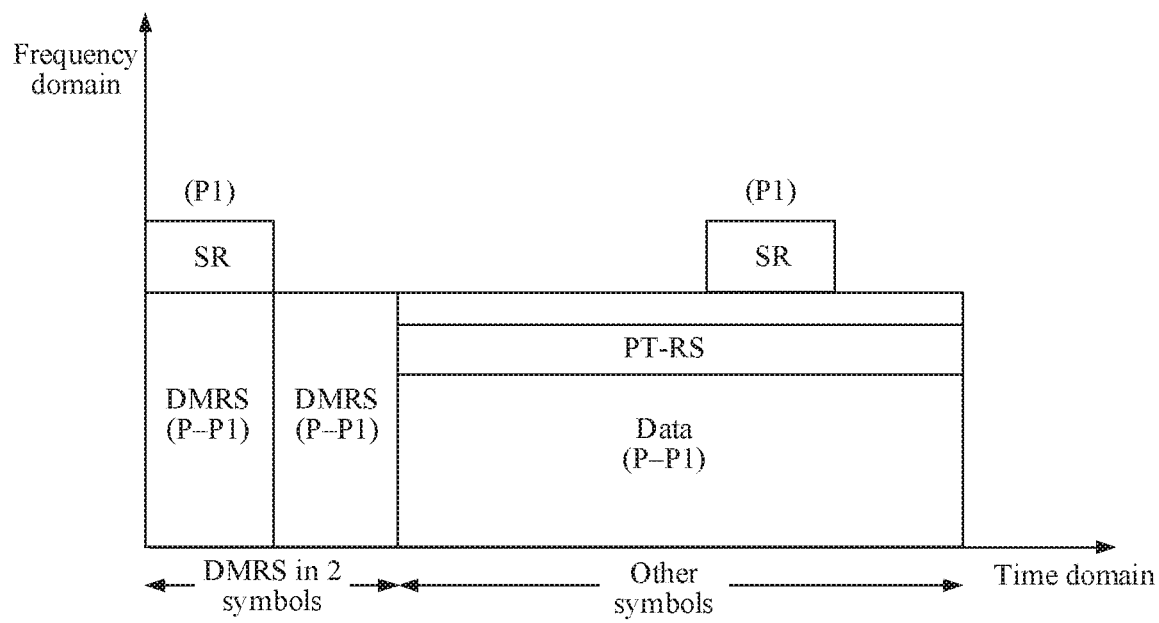
FIG. 5(1) and FIG. 5(2) each are a schematic diagram of power allocation in different time-domain symbols on a PUSCH according to an embodiment of this application.
Figure 5:
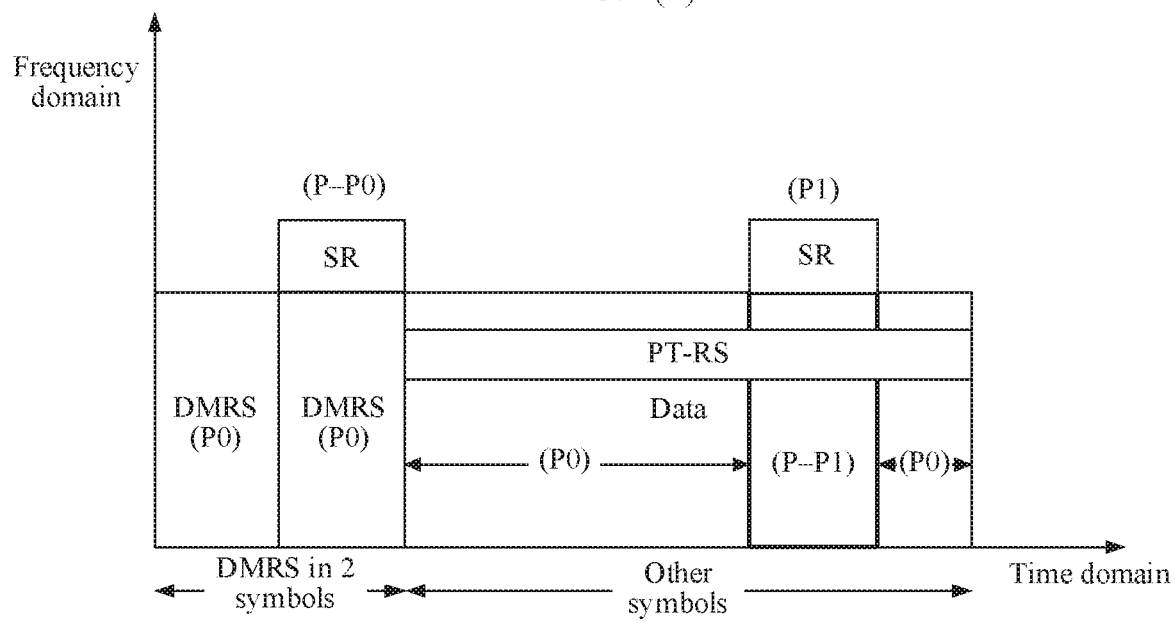

For example, if the transmit power required for the DMRS is P0, the transmit power required for the SR is P1, and the total transmit power of the terminal in each symbol is P. As shown in FIG. 5(1), when the PUCCH carrying the SR collides with the PUSCH in the $1^{st}$ DMRS symbol, a transmit power allocated to the SR in the $1^{st}$ symbol may be P1, and a transmit power allocated to the DMRS in the $1^{st}$ symbol may be P-P1. Based on the SR period, if the PUCCH carrying the SR in the next period collides with the PUSCH in one of the data symbols, the transmit power for carrying the SR on the PUCCH in the next period may be P1, a transmit power in the data symbol may be P-P1, and a transmit power for data carried in a remaining data symbol may be P-P1. As shown in FIG. 5(2), when the PUCCH carrying the SR collides with the PUSCH in the $2^{nd}$ DMRS symbol, a transmit power for the $1^{st}$ DMRS may be P0, the transmit power allocated to the SR may be P-P0, and the transmit power allocated to the DMRS may be P. Based on the SR period, if the PUCCH carrying the SR in the next period collides with the PUSCH in one of the data symbols, the transmit power for carrying the SR on the PUCCH in the next period may be P1, a transmit power in the data symbol may be P-P1, and a transmit power for data carried in a remaining data symbol may be P0.

Optionally, when the base station cannot identify the variation of the transmit power for the PUSCH in the data symbol, if no PT-RS is carried in the data symbol after the overlapping symbol, the transmit power for the data carried in the data symbol keeps the same as the transmit power required for carrying the DMRS on the PUSCH, and a transmit power in the symbol for carrying the SR on the first uplink channel in a next period is a difference between a total transmit power of the terminal in the data symbol and a transmit power in the overlapping data symbol.

Figure 6:
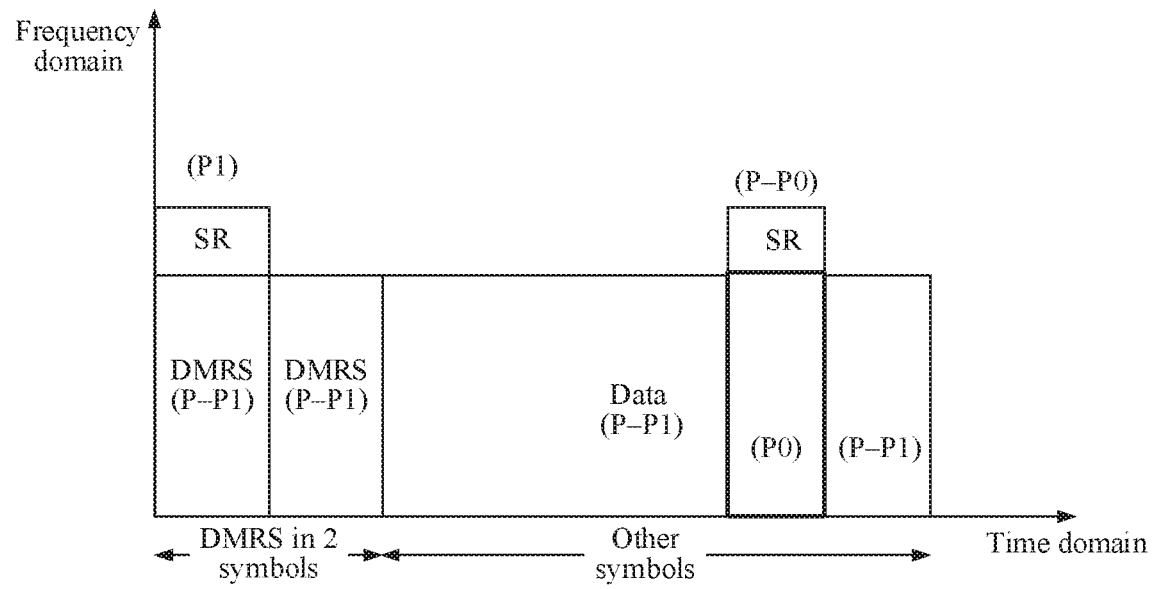
FIG. 6(1) and FIG. 6(2) each are a schematic diagram of power allocation in different time-domain symbols on a PUSCH according to an embodiment of this application.
Figure 6:
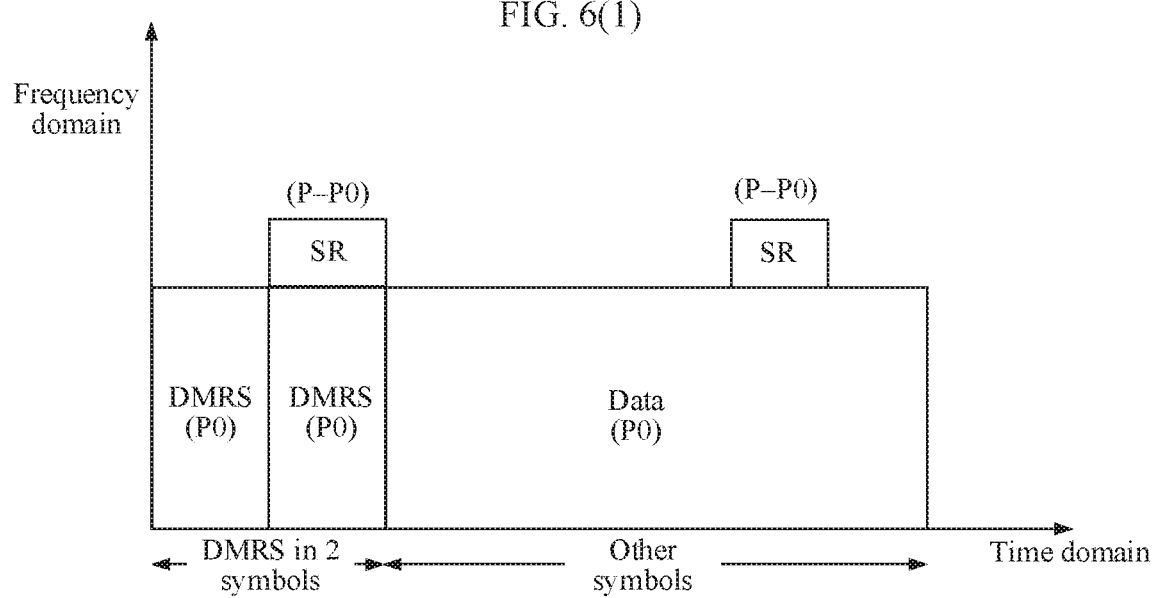

For example, when the PUSCH does not collide with the PUCCH, the transmit power required for the DMRS is P0, the transmit power required for the SR is P1, and the total transmit power of the terminal in each symbol is P. As shown in FIG. 6(1), when the PUCCH carrying the SR collides with the PUSCH in the $1^{st}$ DMRS symbol, a transmit power allocated to the SR in the $1^{st}$ symbol may be P1, and a transmit power allocated to the DMRS in the $1^{st}$ symbol may be P-P1. Based on the SR period, if the PUCCH carrying the SR in the next period collides with the PUSCH in one of the data symbols, the transmit power for carrying the SR on the PUCCH in the next period may be P-P0, a transmit power in the same data symbol may be P0, and a transmit power for data carried in a remaining data symbol may be P-P1. As shown in FIG. 6(2), when the PUCCH carrying the SR collides with the PUSCH in the $2^{nd}$ DMRS symbol, a transmit power for the $1^{st}$ DMRS may be P0, the transmit power allocated to the SR may be P-P0, and the transmit power allocated to the DMRS may be P0. Based on the SR period, if the PUCCH carrying the SR in the next period collides with the PUSCH in one of the data symbols, the transmit power for carrying the SR on the PUCCH in the next period may be P-P0, a transmit power in the data symbol may be P0, and a transmit power for data carried in a remaining data symbol may be P0.

Optionally, when the base station can identify the variation of the transmit power for the PUSCH in the data symbol, if no PT-RS is carried in the data symbol after the overlapping symbol, a transmit power for carrying the SR on the first uplink channel in a next period is the transmit power required for the SR, and the transmit power in the data symbol is a difference between a total transmit power of the terminal in the data symbol and the transmit power for carrying the SR on the first uplink channel in the next period.

Figure 7:
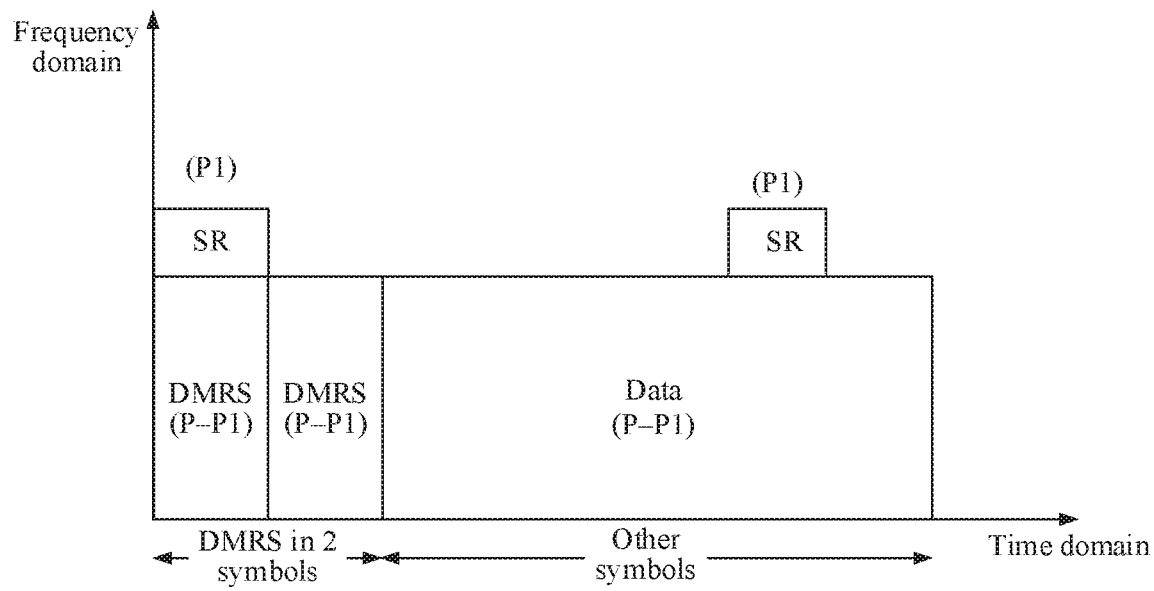
FIG. 7(1) and FIG. 7(2) each are a schematic diagram of power allocation in different time-domain symbols on a PUSCH according to an embodiment of this application.
Figure 7:
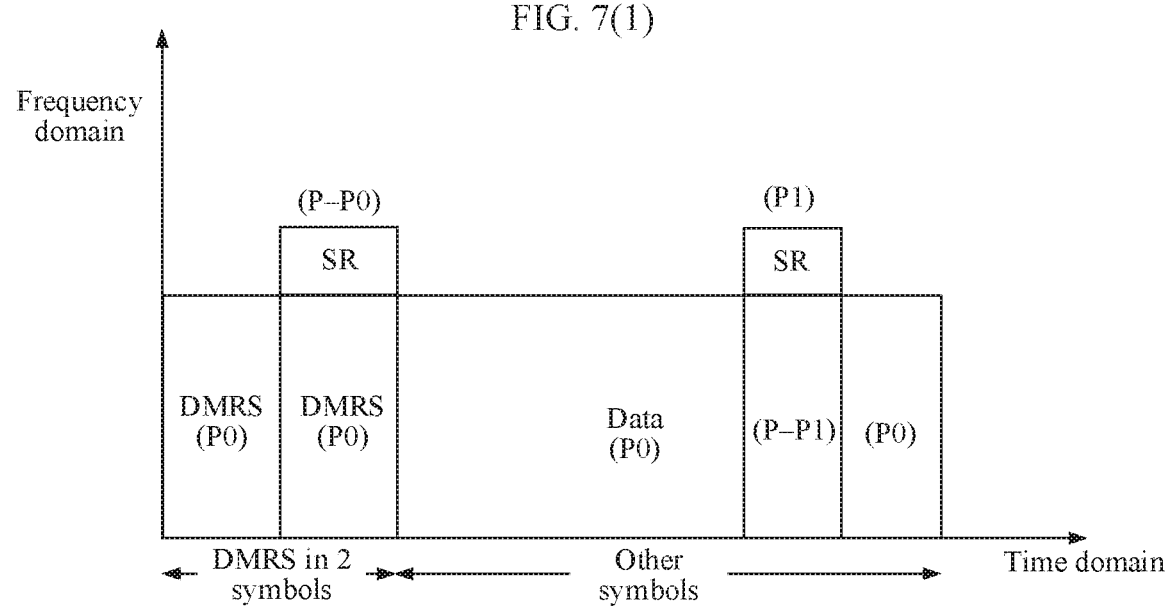

For example, when the PUSCH does not collide with the PUCCH, the transmit power required for the DMRS is P0, the transmit power required for the SR is P1, and the total transmit power of the terminal in each symbol is P. As shown in FIG. 7(1), when the PUCCH carrying the SR collides with the PUSCH in the $1^{st}$ DMRS symbol, a transmit power allocated to the SR in the $1^{st}$ symbol may be P1, and a transmit power allocated to the DMRS in the $1^{st}$ symbol may be P-P1. Based on the SR period, if the PUCCH carrying the SR in the next period collides with the PUSCH in one of the data symbols, the transmit power for carrying the SR on the PUCCH in the next period may be P1, a transmit power in the same data symbol may be P-P1, and a transmit power for data carried in a remaining data symbol may be P-P. As shown in FIG. 7(2), when the PUCCH carrying the SR collides with the PUSCH in the $2^{nd}$ DMRS symbol, a transmit power for the $1^{st}$ DMRS may be P0, the transmit power allocated to the SR may be P-P0, and the transmit power allocated to the DMRS may be P0. Based on the SR period, if the PUCCH carrying the SR in the next period collides with the PUSCH in one of the data symbols, the transmit power for carrying the SR on the PUCCH in the next period may be P1, a transmit power in the same data symbol may be P-P1, and a transmit power for data carried in a remaining data symbol may be P0.

Figure 17:
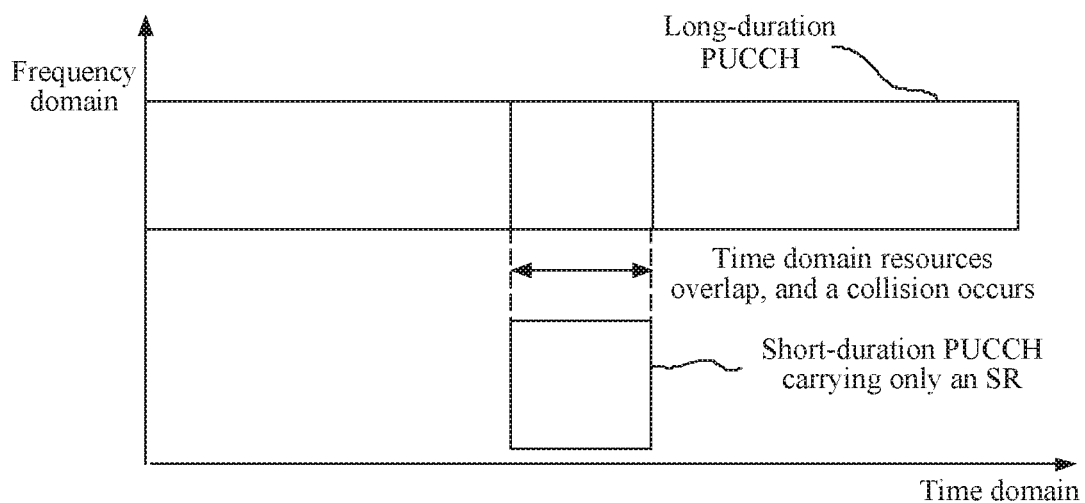
FIG. 17 is a schematic diagram of a structure when a long-duration PUCCH collides with a PUCCH carrying only an SR according to an embodiment of this application.
Figure 18:
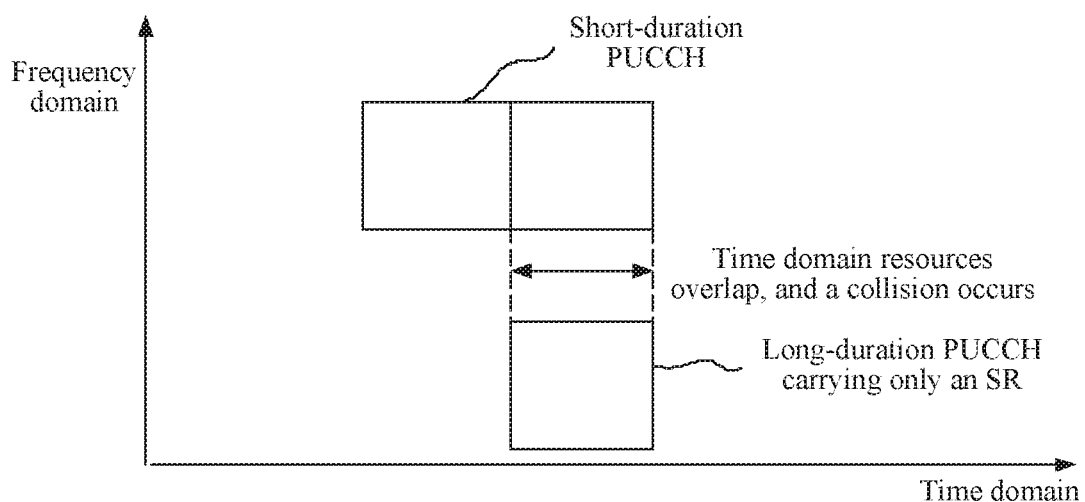
FIG. 18 is a schematic diagram of a structure when a short-duration PUCCH collides with a PUCCH carrying only an SR according to an embodiment of this application.

In another implementation scenario, the second uplink channel is a PUCCH, and the second uplink channel may be a long-duration PUCCH shown in FIG. 17, or may be a short-duration PUCCH shown in FIG. 18. For example, the long-duration PUCCH is a PUCCH with a length of 4 to 14 symbols, and the short-duration PUCCH may be a PUCCH with a length of one symbol or a PUCCH with a length of two symbols. In this implementation scenario, that the terminal transmits the second uplink channel on the first time domain resource by using the second transmit power in step 102 means that the terminal transmits, on the resource that is allocated to the second uplink channel and that corresponds to the first time domain resource, uplink control information that is carried on the second uplink channel on the first time domain resource.

It should be noted that information carried on the long-duration PUCCH may be uplink control information other than the SR, such as an ACK/a NACK and a CQI, or may be the SR and the uplink control information. However, a case in which the long-duration PUCCH carries only the SR is not included. Information carried on the short-duration PUCCH may be uplink control information other than the SR, such as an ACK/a NACK and a CQI, or may be the SR and the uplink control information. In this application, a case in which the short-duration PUCCH carries only the SR is not included.

It should be noted that the long-duration PUCCH is classified into two types: a long-duration PUCCH on which an OCC is used to perform multi-user multiplexing and a long-duration PUCCH on which an OCC is not used to perform multi-user multiplexing. When the OCC is used, because different users need to cancel interference from other users by using different codewords, a requirement for a transmit power for information carried in each symbol keeps unchanged. The short-duration PUCCH is classified into three types: a short-duration PUCCH that occupies a single symbol, a short-duration PUCCH that occupies a short-duration PUCCH with two symbols for performing joint encoding, and a short-duration PUCCH that occupies a short-duration PUCCH on which an OCC is enabled by using two symbols. If the short-duration PUCCH is the short-duration PUCCH on which the OCC is enabled by using two symbols, a requirement for a transmit power for information carried in each symbol keeps unchanged, to avoid interference between a plurality of users.

In an implementation scenario in which the second uplink channel is the long-duration PUCCH (as shown in FIG. 17), based on different cases of the first time domain resource included in the time domain resources occupied by the second uplink channel, the first transmit power and the second transmit power that are respectively allocated by the terminal to the first uplink channel and the second uplink channel also have different configurations. Details are as follows:

Optionally, when an orthogonal cover code OCC is used for a second uplink signal, and the first time domain resource is the same as a start time domain resource used for the second uplink channel or a start time domain resource used for the second uplink channel in frequency hopping, the first transmit power is not less than the transmit power required for the SR, and the second transmit power is the difference between the total transmit power of the terminal on the first time domain resource and the first transmit power.

For example, the long-duration PUCCH occupies 14 symbols, and the first uplink channel occupies one symbol. It is assumed that the transmit power required for the SR is P1, a transmit power for the long-duration PUCCH in each symbol is P2, and a total transmit power of the terminal on the long-duration PUCCH in each symbol is P. When the symbol for carrying the SR on the first uplink channel overlaps with the $1^{st}$ symbol on the long-duration PUCCH, the transmit power allocated to the SR may be P1, and a transmit power allocated to uplink control information carried on the long-duration PUCCH in the $1^{st}$ symbol may be P-P1, and a transmit power for uplink control information carried in each of the $2^{nd}$ symbol to the $7^{th}$ symbol is the same as the transmit power for the information carried in the $1^{st}$ symbol, where both may be P-P1. Alternatively, when the symbol for carrying the SR on the first uplink channel overlaps with the $8^{th}$ symbol on the long-duration PUCCH, the transmit power allocated to the SR may be P1, a transmit power allocated to uplink control information carried on the long-duration PUCCH in the $8^{th}$ symbol may be P-P1, and a transmit power for uplink control information carried in each of the $9^{th}$ symbol to the $14^{th}$ symbol is the same as the transmit power for the information carried in the $8^{th}$ symbol, where both may be P-P1.

Optionally, when an OCC is used for a second uplink signal, and the first time domain resource is the same as a time domain resource after a start time domain resource used for the second uplink channel or a time domain resource after a start time domain resource used for the second uplink channel in frequency hopping, the second transmit power is the same as a transmit power of the terminal on the start time domain resource, and the first transmit power is the difference between the total transmit power of the terminal on the first time domain resource and the second transmit power.

For example, the long-duration PUCCH occupies 14 symbols, and the first uplink channel occupies one symbol. It is assumed that the transmit power required for the SR is P1, a transmit power for the long-duration PUCCH in each symbol is P2, and a total transmit power of the terminal in each symbol is P. When the symbol for carrying the SR on the first uplink channel overlaps with the $2^{nd}$ symbol on the long-duration PUCCH, the transmit power allocated to the SR may be P-P2, and a transmit power for information carried on the long-duration PUCCH in each symbol may be P2. Alternatively, when the symbol for carrying the SR on the first uplink channel overlaps with the $9^{th}$ symbol on the long-duration PUCCH, the transmit power allocated to the SR may be P-P2, and a transmit power for information carried on the long-duration PUCCH in each symbol may be P2.

Optionally, when an OCC is not used for a second uplink signal, the first transmit power is not less than the transmit power required for the SR, and the second transmit power is the difference between the total transmit power of the terminal on the first time domain resource and the first transmit power.

For example, the long-duration PUCCH occupies 14 symbols, and the first uplink channel occupies one symbol.

It is assumed that the transmit power required for the SR is P1, a transmit power for the long-duration PUCCH in each symbol is P2, and a total transmit power of the terminal in each symbol is P. When an OCC is not used on the long-duration PUCCH to perform multi-user multiplexing, and a symbol for carrying the SR on the first uplink channel overlaps with a symbol on the long-duration PUCCH, the transmit power allocated to the SR is at least P1, and a transmit power allocated to uplink control information carried on the long-duration PUCCH in the overlapping symbol is P-P1. Optionally, a transmit power for the long-duration PUCCH in another symbol may be P2, or may be P-P1.

In the 5G system, because the SR period may be flexibly configured, the first uplink channel may collide once with the long-duration PUCCH in a length of the symbols occupied by the PUCCH, or the first uplink channel may collide a plurality of times with the long-duration PUCCH in a length of the symbols occupied by the PUCCH. Therefore, in another implementation scenario, a case of the first time domain resource included in the time domain resources occupied by the second uplink channel may be any combination of the foregoing several cases. For example, the symbol for carrying the SR on the first uplink channel may overlap with a symbol on the long-duration PUCCH on a location of one of or a combination of any two or three of the $1^{st}$ symbol on the long-duration PUCCH, the $1^{st}$ symbol on the long-duration PUCCH in frequency hopping, a symbol other than the $1^{st}$ symbol on the long-duration PUCCH, or a symbol other than the $1^{st}$ symbol on the long-duration PUCCH in frequency hopping. In this case, a manner of configuring the first transmit power and the second transmit power may include one of the foregoing several optional configuration manners, or may include any combination of the foregoing several optional configuration manners.

In an implementation scenario in which the second uplink channel is the short-duration PUCCH and is transmitted in a frequency hopping manner, based on different cases of the first time domain resource included in the time domain resources occupied by the second uplink channel, the first transmit power and the second transmit power also have different configurations. Details are as follows:

Optionally, the first transmit power is not less than the transmit power required for the SR, and the second transmit power is the difference between the total transmit power of the terminal on the first time domain resource and the first transmit power.

Optionally, the second transmit power is not less than a transmit power required for the second uplink channel, and the first transmit power is the difference between the total transmit power of the terminal on the first time domain resource and the second transmit power.

Optionally, the first transmit power is equal to the second transmit power, and the first transmit power and the second transmit power are obtained by the terminal by allocating the total transmit power of the terminal on the first time domain resource according to an equal allocation principle.

Optionally, the first transmit power and the second transmit power are obtained by allocating the total power based on a ratio of an information amount of the SR to an information amount of uplink control information carried on the second uplink channel.

In an implementation scenario (as shown in FIG. 18) in which the second uplink channel is the short-duration PUCCH and an orthogonal cover code OCC is used to perform multi-user multiplexing, based on different cases of the first time domain resource included in the time domain resources occupied by the second uplink channel, the first transmit power and the second transmit power also have different configurations. Details are as follows:

Optionally, when the first time domain resource is the same as the $1^{st}$ time domain resource (for example, the $1^{st}$ symbol) used for the second uplink channel, the first transmit power is not less than a transmit power required for the first uplink channel, and the second transmit power is the difference between the total transmit power of the terminal on the first time domain resource and the first transmit power; or the second transmit power is not less than the transmit power required for the second uplink channel, and the first transmit power is the difference between the total transmit power of the terminal on the first time domain resource and the second transmit power.

Optionally, when the first time domain resource is the same as a time domain resource (for example, the $2^{nd}$ symbol) that is after the $1^{st}$ time domain resource and that is used for the second uplink channel, the second transmit power is the same as a transmit power on the $1^{st}$ time domain resource used for the second uplink channel, and the first transmit power is the difference between the total transmit power of the terminal on the first time domain resource and the second transmit power.

In the 5G system, because the SR period may be flexibly configured, the first uplink channel may collide once with the short-duration PUCCH on the time domain resources occupied by the short-duration PUCCH, or the first uplink channel may collide a plurality of times with the short-duration PUCCH in a length of symbols occupied by the short-duration PUCCH. Therefore, in another implementation scenario, a case of the first time domain resource included in the time domain resources occupied by the second uplink channel may be any combination of the foregoing several cases. A manner of configuring the first transmit power and the second transmit power may include one of the foregoing several optional configuration manners, or may include any combination of the foregoing several optional configuration manners.

Optionally, for any configuration case of the first transmit power and the second transmit power in the foregoing several implementation scenarios, if the second transmit power is less than the transmit power required for the second uplink channel, the terminal transmits the SR on the first time domain resource.

Optionally, after the SR is transmitted, the terminal transmits the second uplink channel, or the transmit power for the second uplink channel is 0.

For example, when the second uplink channel is the PUCCH, if the second transmit power is less than the transmit power required for the second uplink channel, the terminal transmits the SR on the first time domain resource. After the SR is transmitted, if time domain resources on which the second uplink channel is not transmitted or has been transmitted include time domain resources respectively used for carrying the DMRS and the uplink control information (for example, UCI), the terminal transmits the second uplink channel. After the SR is transmitted, if time domain resources on which the second uplink channel is not transmitted or has been transmitted do not include time domain resources used for carrying the DMRS and the uplink control information, the transmit power for the second uplink channel is 0.

Optionally, for any configuration case of the first transmit power and the second transmit power in the foregoing several implementation scenarios, if the first transmit power is less than the transmit power required for the first uplink channel, the terminal transmits the second uplink channel on the first time domain resource.

Optionally, for any configuration case of the first transmit power and the second transmit power in the foregoing several implementation scenarios, a transmit power for information carried on a time domain resource that is used for the second uplink channel and that is different from the first time domain resource used for the first uplink channel is the same as the second transmit power.

Optionally, for any configuration case of the first transmit power and the second transmit power in the foregoing several implementation scenarios, a transmit power for information carried on a time domain resource that is used for the second uplink channel and that is different from the first time domain resource used for the first uplink channel proportionally increases relative to the second transmit power.

In the 5G system, because the SR period may be flexibly configured, the time domain resource used for the first uplink channel may collide with some or all time domain resources used for the PUSCH, the time domain resource used for the first uplink channel may collide with some or all time domain resources used for the long-duration PUCCH, the time domain resource used for the first uplink channel may collide with some or all time domain resources used for the short-duration PUCCH, or the time domain resource used for the first uplink channel may collide with one of or any two or three of those used for the PUSCH, the long-duration PUCCH, or the short-duration PUCCH. Therefore, a case of the first time domain resource included in the time domain resources occupied by the second uplink channel may be any combination of the different cases in the foregoing several implementation scenarios. A manner of configuring the first transmit power and the second transmit power may include one of the configuration manners in the foregoing several implementation scenarios, or may include any combination of the configuration manners in the foregoing several implementation scenarios.

To resolve a signal transmission problem on a time domain resource on which a collision occurs, this application further provides another uplink transmission method, mainly including the following steps.

Step 201: A terminal obtains a first time domain resource and a first frequency domain resource, and obtains a second time domain resource and a second frequency domain resource.

Both the first frequency domain resource and the second frequency domain resource are included in frequency domain resources configured by a base station for a PUSCH, and the second time domain resource is included in the first time domain resource. There is a mapping relationship between the first frequency domain resource and the first time domain resource, and the first frequency domain resource and the first time domain resource are used to transmit information carried on the PUSCH. There is a mapping relationship between the second frequency domain resource and the second time domain resource, and the second frequency domain resource and the second time domain resource are used to send an SR.

Step 202: The terminal sends the information by using the first time domain resource and the first frequency domain resource, where the information includes a DMRS and/or data carried on the PUSCH; and the terminal sends the scheduling request SR by using the second time domain resource and the second frequency domain resource.

That the terminal sends the information by using the first frequency domain resource and the first time domain resource in step 202 includes the following cases:

The terminal sends the DMRS on the PUSCH by using the first frequency domain resource and the first time domain resource, or the terminal sends the data on the PUSCH by using the first frequency domain resource and the first time domain resource, or the terminal sends both the DMRS and the data on the PUSCH by using the first frequency domain resource and the first time domain resource.

A possible relationship between the first time domain resource and the second time domain resource is as follows:

All time domain resources of the second time domain resource are the same as all or some time domain resources of the first time domain resource, or some time domain resources of the second time domain resource are the same as all or some time domain resources of the first time domain resource.

It should be noted that a length of the first time domain resource is a length of a symbol occupied by a PUCCH, and is preconfigured by the base station for the terminal or prestored on the terminal. The length may be a length of one symbol, a length of two symbols, or a length greater than two symbols.

It should be noted that the SR is periodically sent, and a symbol length of the second time domain resource is related to an SR period and a length of a symbol occupied by each SR. Optionally, the length of the symbol occupied by each SR is a length of one symbol or a length of two symbols.

In this application, the SR period may be flexibly configured. The SR period is preconfigured by the base station for the terminal, or prestored on the terminal. For example, the SR period may be a length of one symbol or a length greater than or equal to two symbols. If the SR period is greater than or equal to the length of the first time domain resource, there may be one SR sending period in the length of the first time domain resource. In this case, the length of the second time domain resource is a length of one symbol occupied by the SR. If the SR period is less than the length of the first time domain resource, there may be a plurality of SR sending periods in the length of the first time domain resource. In this case, the length of the second time domain resource is greater than a length of one symbol or greater than a length of two symbols.

In this application, a time domain resource used by the terminal to send the DMRS on the PUSCH may be the same as the time domain resource used by the terminal to send the SR in time domain, a time domain resource used by the terminal to send the data on the PUSCH may be the same as the time domain resource used by the terminal to send the SR in time domain, or both a time domain resource used by the terminal to send the data on the PUSCH and a time domain resource used by the terminal to send the DMRS on the PUSCH may be the same in time domain as the time domain resource used for sending the SR. When the SR is carried on the PUSCH for transmission, based on the SR period, the terminal may send the SR in one or more data symbols on the PUSCH, the terminal may send the SR in one or two DMRS symbols on the PUSCH, or the terminal sends the SR in both one or more data symbols and one or two DMRS symbols.

Optionally, all time domain resources of the second time domain resource are the same as all time domain resources of the first time domain resource. In other words, the first time domain resource fully overlaps with the second time domain resource in time domain. For example, the SR period is the length of one symbol. Regardless of whether the length of the symbol occupied by each SR is the length of one symbol or the length of two symbols, the SR may be sent on the PUSCH in each symbol. In this case, the length of the second time domain resource is the same as the length of the first time domain resource.

Optionally, all time domain resources of the second time domain resource are the same as some time domain resources of the first time domain resource. In other words, all time domain resources of the second time domain resource overlap with some time domain resources of the first time domain resource in time domain. For example, the SR period is the length of two symbols, and the SR period is less than the length of the first time domain resource. The SR may be sent at an interval of a length of two symbols in a symbol length of the PUSCH. If the length of the symbol occupied by each SR is the length of one symbol, the SR is sent in some symbols on the PUSCH. In this case, all time domain resources of the second time domain resource overlap with some time domain resources of the first time domain resource in time domain.

Optionally, some time domain resources of the second time domain resource are the same as all time domain resources of the first time domain resource. In other words, some time domain resources of the second time domain resource overlap with all time domain resources of the first time domain resource in time domain. For example, the SR period is greater than the length of the first time domain resource, the second time domain resource has a length of two symbols, the first time domain resource has a length of one symbol, and a length in time domain of one of the symbols of the second time domain resource overlaps with the length in time domain of the symbol of the first time domain resource.

Optionally, some time domain resources of the second time domain resource are the same as some time domain resources of the first time domain resource. In other words, some time domain resources of the second time domain resource overlap with some time domain resources of the first time domain resource in time domain.

For example, the SR period is the length of two symbols, and the SR period is less than the length of the first time domain resource. The SR may be sent at an interval of a length of two symbols in a symbol length of the PUSCH. If the length of the symbol occupied by each SR is the length of two symbols, the $2^{nd}$ symbol of the second time domain resource overlaps with the $1^{st}$ symbol of the first time domain resource in time domain. In this case, the SR is sent in some symbols on the PUSCH, and some of the second time domain resources overlap with some of the first time domain resources in time domain. For another example, if the SR period is greater than the length of the first time domain resource, the length of the second time domain resource is the length of two symbols, the length of the first time domain resource is greater than or equal to the length of two symbols, and a length in time domain of one of the symbols in time domain of the second time domain resource overlaps with a length of one of the symbols of the first time domain resource.

It should be noted that the foregoing descriptions are merely examples, and do not represent all examples.

In the foregoing method procedure, the second time domain resource and the second frequency domain resource that are used to send the SR are some resources that are in resources configured for the PUSCH and that are reserved for the SR. When the PUCCH carrying only the SR and the PUSCH occupy a same time domain resource, the SR is carried on the PUSCH for transmission in the foregoing method procedure. This further resolves a prior-art signal transmission problem that arises when the short-duration PUCCH carrying only the SR collides with another uplink channel on a same time domain resource.

Based on different cases in which the terminal sends the information by using the first frequency domain resource and the first time domain resource in step 202, relationships between the first frequency domain resource and the second frequency domain resource are different.

Optionally, when the terminal sends the DMRS on the PUSCH by using the first frequency domain resource and the first time domain resource, the first frequency domain resource includes a frequency domain resource occupied by the DMRS on the PUSCH, and the first time domain resource includes a time domain resource occupied by the DMRS on the PUSCH. In this case, all frequency domain resources of the second frequency domain resource are the same as all or some frequency domain resources of the first frequency domain resource, or some frequency domain resources of the second frequency domain resource are the same as all or some frequency domain resources of the first frequency domain resource.

Figure 8:
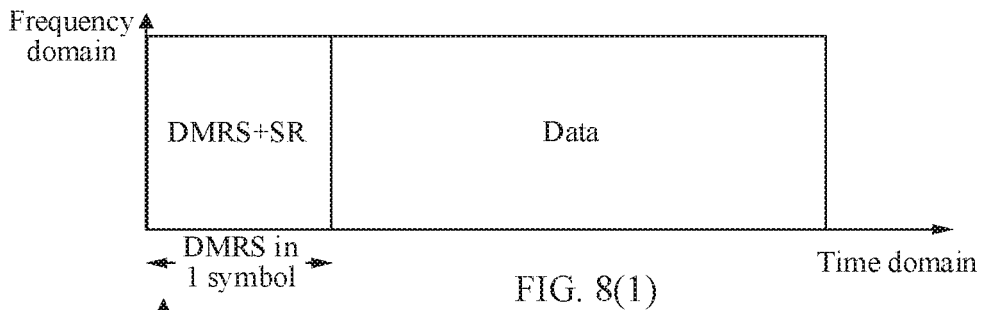
FIG. 8(1) to FIG. 8(5) and FIG. 9(1) and FIG. 9(2) each are a schematic diagram of a structure for carrying an SR on a PUSCH according to an embodiment of this application.
Figure 8:
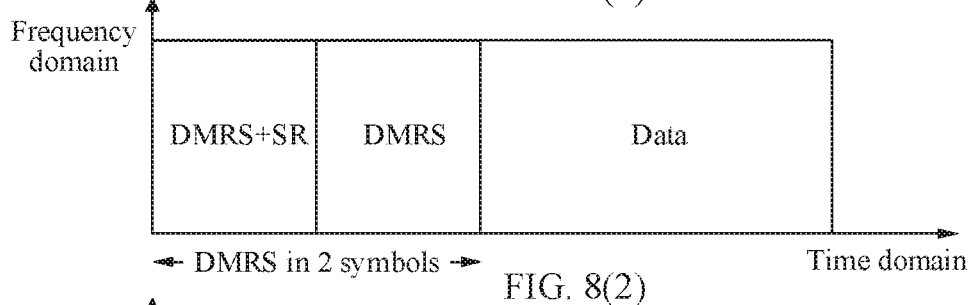
Figure 8:
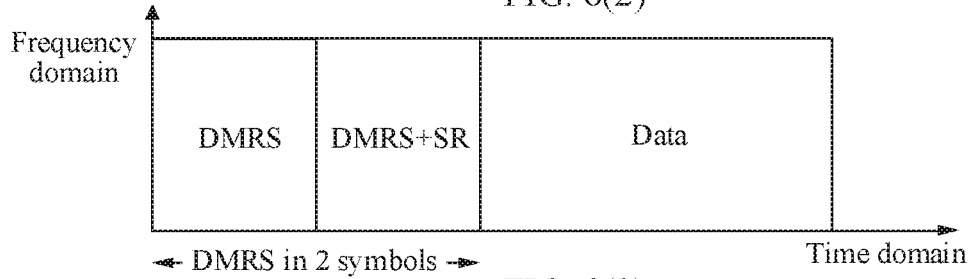
Figure 8:
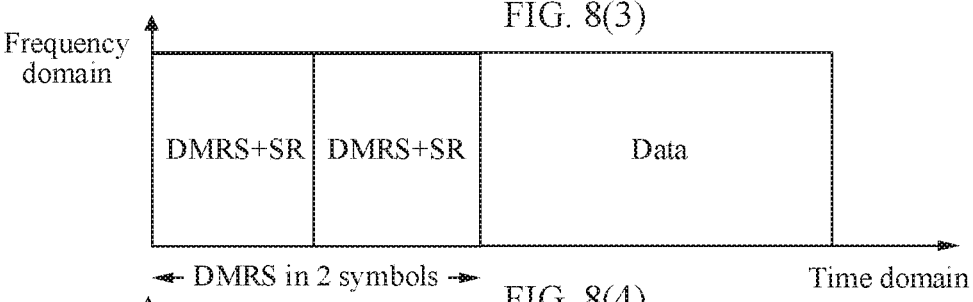
Figure 8:
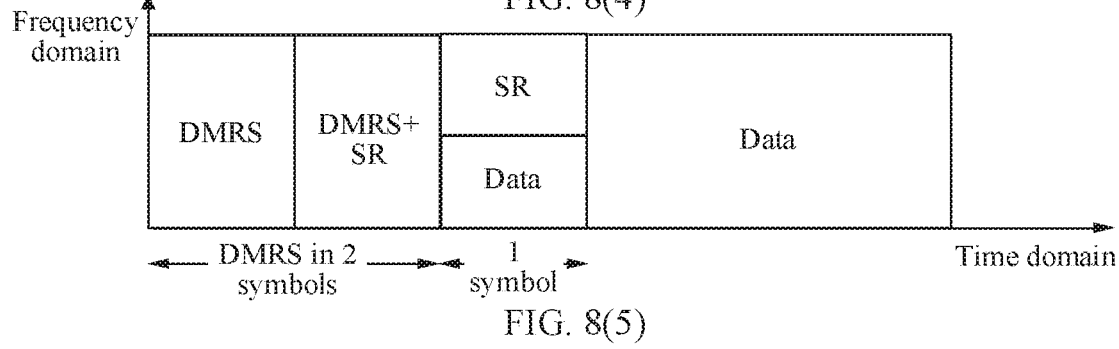

For example, as shown in FIG. 8(1) and FIG. 8(4), a frequency domain resource occupied by the SR may be the same as all frequency domain resources occupied by the DMRS, or a frequency domain resource occupied by the SR may be the same as some frequency domain resources occupied by the DMRS. As shown in FIG. 8(2), a frequency domain resource occupied by the SR is the same as some or all frequency domain resources occupied by the $1^{st}$ DMRS. As shown in FIG. 8(3), a frequency domain resource occupied by the SR is the same as some or all frequency domain resources occupied by the $2^{nd}$ DMRS.

Optionally, when the terminal sends the data on the PUSCH by using the first frequency domain resource and the first time domain resource, the first frequency domain resource includes a frequency domain resource occupied by the data on the PUSCH, and the first time domain resource includes a time domain resource occupied by the data on the PUSCH. In this case, the first frequency domain resource is different from the second frequency domain resource.

The second frequency domain resource is a frequency domain resource that is in frequency domain resources configured by the base station for the PUCCH and that is reserved and specially used to send the SR, and a remaining frequency domain resource is the first frequency domain resource. Therefore, that the second frequency domain resource is different from the first frequency domain resource means that in the frequency domain resources configured by the base station for the PUCCH, the first frequency domain resource is different from the second frequency domain resource. In addition, that the first frequency domain resource is different from the second frequency domain resource may be further understood from a perspective of use frequencies corresponding to the frequency domain resources. To be specific, a frequency of the second frequency domain resource is greater than or equal to a minimum frequency of the first frequency domain resource, and the frequency of the second frequency domain resource is less than or equal to a maximum frequency of the first frequency domain resource.

Optionally, when the terminal sends the DMRS and the data on the PUSCH by using the first frequency domain resource and the first time domain resource, the first frequency domain resource includes a frequency domain resource occupied by the DMRS on the PUSCH and a frequency domain resource occupied by the data on the PUSCH, and the first time domain resource includes a time domain resource occupied by the DMRS on the PUSCH and a time domain resource occupied by the data on the PUSCH. In this case, the first frequency domain resource may be partially the same as the second frequency domain resource.

In an implementation scenario, when the time domain resource used by the terminal to send the DMRS on the PUSCH is the same as the time domain resource used by the terminal to send the SR, the terminal simultaneously sends the DMRS and the SR by using a frequency domain resource corresponding to the same time domain resource.

When the time domain resource occupied by the DMRS is the same as the time domain resource occupied by the SR, the following several cases are mainly included:

First, if a length of a symbol occupied by the SR is a length of one symbol, a length of a symbol occupied by the DMRS is a length of one symbol, and the length of one symbol occupied by the DMRS is the same as the length of one symbol occupied by the SR in time domain, in the length of the same symbol, a frequency domain resource occupied by the DMRS may be the same as a frequency domain resource occupied by the SR, or some frequency domain resources occupied by the DMRS are the same as a frequency domain resource occupied by the SR. For example, as shown in FIG. 8(1), both the SR and the DMRS are carried on the PUSCH in a DMRS symbol. The DMRS symbol occupies one symbol, and the SR and the DMRS occupies a same frequency domain resource.

Second, if a length of a symbol occupied by the SR is a length of one symbol, a length of a symbol occupied by the DMRS is a length of two symbols, and the length of one symbol occupied by the SR is the same as a length of the $1^{st}$ symbol occupied by the DMRS in time domain, in the length of the same symbol, some frequency domain resources occupied by the DMRS are the same as a frequency domain resource occupied by the SR. For example, as shown in FIG. 8(2), the DMRS occupies two symbols on the PUSCH, and both the SR and the DMRS are carried on the PUSCH in the $1^{st}$ DMRS symbol. The frequency domain resource occupied by the SR may be the same as some frequency domain resources occupied by the $1^{st}$ DMRS, or may be the same as all frequency domain resources occupied by the $1^{st}$ DMRS. The $2^{nd}$ DMRS symbol is used to carry only the DMRS.

Third, if a length of a symbol occupied by the SR is a length of one symbol, a length of a symbol occupied by the DMRS is a length of two symbols, and the length of one symbol occupied by the SR is the same as a length of the $2^{nd}$ symbol occupied by the DMRS in time domain, in the length of the same symbol, some frequency domain resources occupied by the DMRS are the same as a frequency domain resource occupied by the SR. For example, as shown in FIG. 8(3), the DMRS occupies two symbols on the PUSCH, the $1^{st}$ DMRS symbol is used to carry only the DMRS, and the $2^{nd}$ DMRS symbol is used to carry the SR and the DMRS. The frequency domain resource occupied by the SR may be the same as some frequency domain resources occupied by the $2^{nd}$ DMRS, or may be the same as all frequency domain resources occupied by the $2^{nd}$ DMRS.

Fourth, if a length of a symbol occupied by the SR is a length of two symbols, a length of a symbol occupied by the DMRS is a length of two symbols, and the length of two symbols occupied by the SR is the same as the length of two symbols occupied by the DMRS in time domain, in the length of the same symbols, a frequency domain resource occupied by the DMRS is the same as a frequency domain resource occupied by the SR. For example, as shown in FIG. 8(4), the DMRS occupies two symbols on the PUSCH, the $1^{st}$ DMRS symbol is used to carry the SR and the DMRS, and the $2^{nd}$ DMRS symbol is used to carry the SR and the DMRS. The frequency domain resource occupied by the SR may be the same as all frequency domain resources occupied by the DMRS, or may be the same as some frequency domain resources occupied by the DMRS.

Fifth, if a length of a symbol occupied by the SR is a length of two symbols, a length of a symbol occupied by the DMRS is a length of two symbols, and a length of the $1^{st}$ symbol occupied by the SR is the same as a length of the $2^{nd}$ symbol occupied by the DMRS in time domain, in the length of the same symbol, a frequency domain resource occupied by the DMRS is the same as a frequency domain resource occupied by the SR. For example, as shown in FIG. 8(5), the DMRS occupies two symbols on the PUSCH, the $1^{st}$ DMRS symbol is used to carry only the DMRS, and the $2^{nd}$ DMRS symbol is used to carry the SR and the DMRS. The frequency domain resource occupied by the SR may be the same as some frequency domain resources occupied by the $2^{nd}$ DMRS, or may be the same as all frequency domain resources occupied by the $2^{nd}$ DMRS. The 1 data symbol after the $2^{nd}$ DMRS symbol is used to carry the data and the SR. However, the data and the SR occupy different frequency domain resources.

Optionally, when the time domain resource occupied by the DMRS is the same as the time domain resource occupied by the SR, on the same time domain resource, the terminal sends the DMRS by using a first sequence, and sends the SR by using a second sequence, where the first sequence is different from the second sequence.

It should be noted that the first time sequence and the second time sequence are orthogonal on the entire PUSCH. Alternatively, the first time sequence and the second time sequence are orthogonal in an overlapping DMRS symbol.

Optionally, when the time domain resource occupied by the DMRS is the same as the time domain resource occupied by the SR, on the same time domain resource, the terminal sends the DMRS by using a first transmit power, and the terminal sends the SR by using a second transmit power.

Optionally, when the terminal does not use the second time domain resource and the second frequency domain resource to send the SR, the second transmit power is 0, and the first transmit power is not less than a transmit power required for the DMRS.

Optionally, if there is one DMRS, when the second time domain resource is the same as the $1^{st}$ time domain resource occupied by the DMRS, the second transmit power is not less than a transmit power required for transmitting the SR, and the first transmit power is a difference between a total transmit power of the terminal on the second time domain resource and the second transmit power.

Optionally, if there are two DMRSs, when the second time domain resource is the same as a time domain resource occupied by the $1^{st}$ DMRS, the second transmit power is not less than a transmit power required for transmitting the SR, and the first transmit power is a difference between a total transmit power of the terminal on the second time domain resource and the second transmit power.

Optionally, if there are two DMRSs, when the second time domain resource is the same as a time domain resource occupied by the $2^{nd}$ DMRS, the first transmit power is the same as a transmit power for the $1^{st}$ DMRS, and the second transmit power is a difference between a total transmit power of the terminal on the second time domain resource and the first transmit power.

It is assumed that the transmit power required for the SR is P1, the transmit power required for the DMRS is P0, and a total transmit power of the terminal in each symbol length is P. For a case shown in FIG. 8(1), the terminal sends the SR in the DMRS symbol by using the second sequence, and the terminal sends the DMRS in the DMRS symbol by using the first sequence. The transmit power for sending the SR is greater than or equal to P1, and the transmit power for transmitting the DMRS is less than or equal to P-P1.

For a case shown in FIG. 8(2), the terminal sends the SR in the $1^{st}$ DMRS symbol by using the second sequence, and the terminal sends the $1^{st}$ DMRS in the $1^{st}$ DMRS symbol by using the first sequence. The transmit power for sending the SR is greater than or equal to P1, and a transmit power for sending the $1^{st}$ DMRS is less than or equal to P-P1. The terminal sends the $2^{nd}$ DMRS in the $2^{nd}$ DMRS symbol. Optionally, a transmit power for sending the $2^{nd}$ DMRS may be the same as the transmit power for sending the $1^{st}$ DMRS.

For a case shown in FIG. 8(3), the terminal sends the $1^{st}$ DMRS in the $1^{st}$ DMRS symbol. Optionally, a transmit power for sending the $1^{st}$ DMRS is at least P0. The terminal sends the SR in the $2^{nd}$ DMRS symbol by using the second sequence, and the terminal sends the $2^{nd}$ DMRS in the $2^{nd}$ DMRS symbol by using the first sequence. The transmit power for sending the SR is P-P0, and a transmit power for sending the $2^{nd}$ DMRS is the same as the transmit power for sending the $1^{st}$ DMRS, that is, P0.

For a case shown in FIG. 8(4), the terminal sends the SR in the $1^{st}$ DMRS symbol and the $2^{nd}$ DMRS symbol by using the second sequence, and the terminal sends the DMRS in the $1^{st}$ DMRS symbol and the $2^{nd}$ DMRS symbol by using the first sequence. The transmit power for sending the SR is greater than or equal to P1, and the transmit power for sending the DMRS is less than or equal to P-P1.

For a case shown in FIG. 8(5), the terminal sends the $1^{st}$ DMRS in the $1^{st}$ DMRS symbol. Optionally, a transmit power for sending the 1l DMRS is at least P0. The terminal sends the SR in the $2^{nd}$ DMRS symbol by using the second sequence, and the terminal sends the $2^{nd}$ DMRS in the $2^{nd}$ DMRS symbol by using the first sequence. The transmit power for sending the SR is P-P0, and a transmit power for sending the $2^{nd}$ DMRS is the same as the transmit power for sending the $1^{st}$ DMRS, that is, P0. The terminal further sends the SR and the data in a data symbol after the $2^{nd}$ DMRS symbol. However, the SR and the data occupy different frequency domain resources.

In another implementation scenario, when some or all time domain resources used by the terminal to send the data are the same as the time domain resource used by the terminal to send the SR in time domain, the terminal sends the SR and the data on the same time domain resource by respectively using different resources. In other words, in resources corresponding to the same time domain resource occupied by the data and the SR, a resource occupied by the data is different from a resource occupied by the SR. A frequency of the resource occupied by the SR is greater than or equal to a minimum frequency of the resource occupied by the data, and a frequency of the resource occupied by the data is less than or equal to a maximum frequency of the resource occupied by the data.

When some time domain resources used by the terminal to send the data are the same as the time domain resource used by the terminal to send the SR, in the resources corresponding to the same time domain resource occupied by the data and the SR, the resource occupied by the SR includes one or more resource groups, and each resource group includes one RE or at least two consecutive REs.

Figure 9:
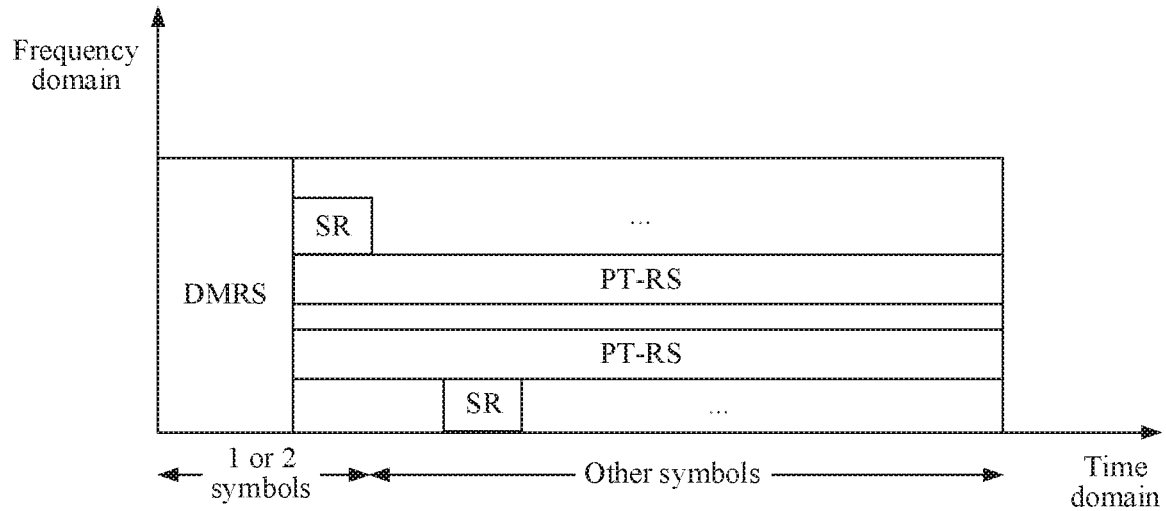
Figure 9:
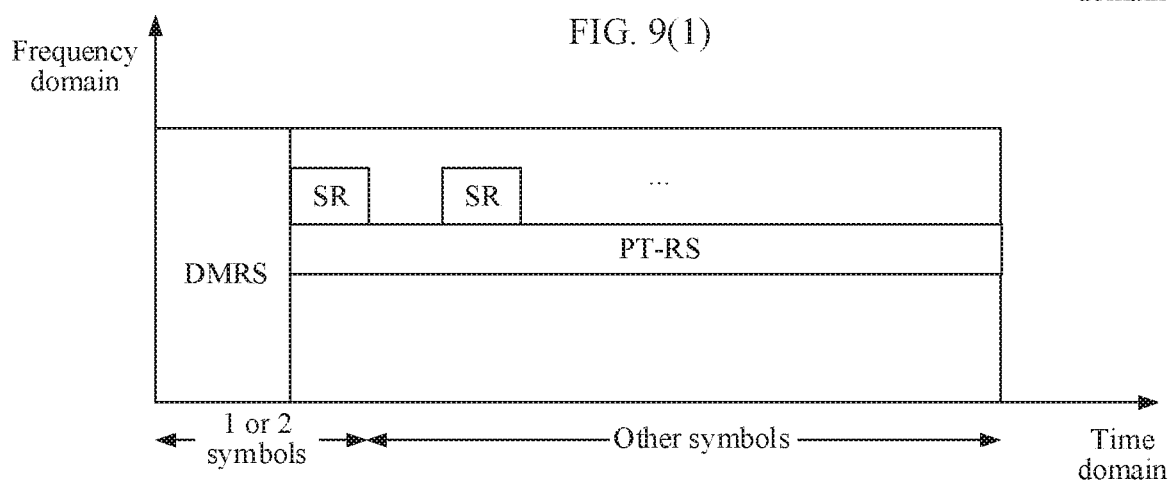

When the terminal sends the SR in some data symbols on the PUSCH, in resources corresponding to the data symbols, a resource group used for carrying the data symbols and a resource group used for carrying the SR are located on different frequency domain resources. As shown in FIG. 9(1) and FIG. 9(2), the terminal adds the SR to at least two data symbols on the PUSCH, and a resource used for carrying the SR is different from a resource used for carrying the data. The resource used for carrying the SR may be set adjacent to a frequency domain resource occupied by a PT-RS, may be set on a same side of a frequency domain resource occupied by a PT-RS, or may be set on different sides of a frequency domain resource occupied by a PT-RS.

To improve SR transmission reliability, in a resource corresponding to a same symbol, there may be two or more resource groups used for carrying the SR.

Optionally, when the frequency domain resource occupied by the SR includes a plurality of resource groups, there is an interval of at least one RE between different resource groups.

For example, when the terminal sends the SR in one of the data symbols on the PUSCH, in a resource corresponding to the data symbol, there are three resource groups used for carrying the SR, and there is an interval of at least one RE between the three resource groups.

Optionally, to improve reliability of the scheduling request, a frequency diversity manner may be used. To be specific, on the same time domain resource, adjacent resource groups that are located on the time domain resource and that are reserved for the SR are located on different frequency domain resources.

For example, if the terminal sends the SR in two consecutive data symbols on the PUSCH, and there is one resource group used for carrying the SR in each data symbol, resource groups used for carrying the SR in the two consecutive data symbols are located on different frequency domain resources.

For example, if the terminal sends the SR in all data symbols on the PUSCH, and there is one resource group used for carrying the SR in each data symbol, resource groups used for carrying the SR in two adjacent data symbols are located on different frequency domain resources.

For example, if the terminal sends the SR in all data symbols on the PUSCH, and there are two resource groups used for carrying the SR in each data symbol, four resource groups used for carrying the SR in two adjacent data symbols are located on different frequency domain resources.

Optionally, if the information further includes a phase tracking reference signal, at least one of the resource groups used for carrying the SR is adjacent to a frequency domain resource occupied by the phase tracking reference signal.

For example, if the phase tracking reference signal is carried on the PUSCH in a data symbol, when the terminal sends the SR in one or more data symbols on the PUSCH, one or more resource groups used for carrying the SR in each data symbol are set close to the frequency domain resource used for carrying the phase tracking reference signal.

Optionally, if the phase tracking reference signal is carried on the PUSCH in a data symbol, when the terminal sends the SR in one or more data symbols on the PUSCH, some of a plurality of resource groups used for carrying the SR in each data symbol may be set close to the frequency domain resource used for carrying the phase tracking reference signal, and some may be set close to a frequency domain resource with a smallest subcarrier number or a largest subcarrier number.

The foregoing embodiment describes the implementation in which the terminal sends the SR in one or two DMRS symbols on the PUSCH and the implementation in which the terminal sends the SR in one or more data symbols on the PUSCH. In a 5G system, because the SR period may be flexibly configured, when the SR is carried on the PUSCH for transmission, based on the SR period, the terminal may send the SR in one or more data symbols on the PUSCH, the terminal may send the SR in one or two DMRS symbols on the PUSCH, or the terminal may send the SR in both one or more data symbols and one or two DMRS symbols. In an implementation scenario in which the terminal sends the SR in both one or more data symbols and one or two DMRS symbols, a solution may be a combination of implementations used in the foregoing two implementations scenarios.

Therefore, to resolve the technical problem that the PUCCH carrying only the SR collides with the PUSCH on some time domain resources, a solution is that the terminal transmits the SR by adding the SR to the PUSCH. The solution may include one of the solutions used in the foregoing two implementation scenarios, or may include a combination of the solutions used in the foregoing two implementation scenarios.

In the prior art, manners of transmitting a short-duration PUCCH carrying an SR, a PUSCH, and another PUCCH are as follows:

In the prior art, the short-duration PUCCH carrying the SR and a PUSCH that can carry some uplink control information cannot be simultaneously transmitted. In LTE, when a long-duration control channel carrying an SR collides with a PUSCH, because the two channels occupy a same time domain resource, if the terminal has a support capability, the terminal can implement simultaneous transmission on the same time domain resource by allocating a power. For example, a transmit power is configured as P1 for the long-duration PUCCH in each symbol, and a transmit power is configured as P-P1 for the PUSCH in each symbol. However, because the short-duration PUCCH carrying only the SR occupies only some symbols, and a quantity of symbols occupied by the short-duration PUCCH carrying only the SR may change flexibly, it is difficult to provide a related power allocation solution.

In LTE, only one scheduling request needs to be configured. An LTE system supports only one service type, and the service type corresponds to only a resource configuration of one scheduling request. Different from LTE, in the 5G system, the terminal may carry a plurality of service types. Therefore, it is stipulated in a current standard discussion that a plurality of service types may be configured in NR. These service types may be carried on a long-duration PUCCH, may be carried on a short-duration PUCCH, or may be carried in another manner. Because these service types are different, SR resources used for these service types are also independently configured. Therefore, a scheduling request of a service may collide with another uplink channel on a time domain resource. In other words, there are both a transmission requirement of the SR and a transmission requirement of the another uplink channel in one symbol. When a delay requirement is extremely high, the SR period may be configured as one symbol. In other words, the SR may be transmitted in each symbol. In this case, how the terminal eliminates a collision between the PUCCH carrying only the scheduling request and the another uplink channel is a problem to be resolved in the disclosure.

Figure 10:
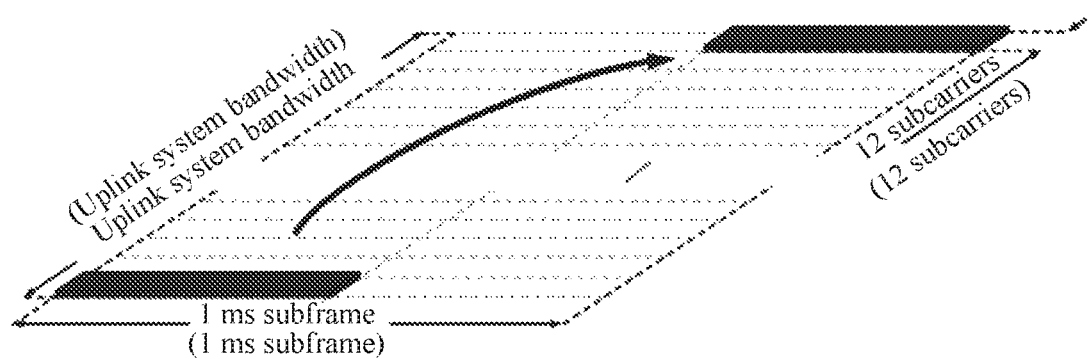
FIG. 10 is a schematic diagram of transmission of a PUCCH according to an embodiment of this application.

In the LTE system, an existing PUCCH transmission mode scheduling method is shown in FIG. 10. A subframe of 1 ms is divided into two segments with each 0.5 ms in time domain for transmission, and transmission locations are on two sides of an entire frequency band, to improve a diversity gain effect. Specifically, 1 ms includes 14 symbols. The first seven symbols are transmitted on one side of the frequency band, and the last seven symbols are transmitted on the other side of the frequency band.

In LTE, the terminal usually initiates the SR in two forms for two cases. In a first case, the terminal has a resource periodically allocated by the base station for the scheduling request. In each period, the terminal may send a scheduling request on a fixed time domain resource, frequency domain resource, and code domain resource. In a second case, the terminal adds an uplink scheduling request when making a response to the uplink scheduling request on a PUCCH. When the base station schedules the terminal to transmit uplink control information, the terminal may jointly encode the uplink scheduling request information and other information, and then send the uplink scheduling request information and the other information to the base station.

In LTE, if the terminal has a support capability, the terminal can simultaneously transmit the PUCCH carrying the scheduling request and the PUSCH. In this case, a power allocation problem arises. However, the short-duration PUCCH is transmitted in 5G NR. Compared with LTE, a difference is that the short-duration PUCCH may be transmitted in only some symbols, and not transmitted in another symbol. In this way, powers in different symbols on the PUSCH may vary, and an original power allocation solution is no longer applicable.

In LTE, the PUSCH may be used to feed back some uplink control information, including channel quality information or downlink ACK/NACK information that is previously transmitted. However, in NR, the scheduling request may have a quite short period, and the SR may be transmitted in each symbol. Therefore, for how to add, to the PUSCH, the scheduling request that has the short period and that is transmitted on an undetermined location, an original manner is no longer applicable. In a further discussion, there is only one service type in LTE, and the service type corresponds to one scheduling request. Therefore, transmitting the PUSCH means that a service of the service type is transmitted, and it is unnecessary to carry the scheduling request on the PUSCH.

In LTE, the scheduling request and other uplink information may be jointly encoded and transmitted to the base station through the PUCCH. However, in NR, the scheduling request may have a comparatively short period and a comparatively high delay requirement, and may be transmitted on the undetermined location. Therefore, the scheduling request and the other uplink information cannot be jointly encoded in advance.

As described above, an existing manner in LTE cannot resolve a problem that arises when the PUCCH with a comparatively short period collides with another channel in the disclosure. When the PUSCH and the PUCCH are simultaneously transmitted, the short-duration PUCCH may be used in 5G NR. To be specific, the PUSCH and the PUCCH are transmitted in only some symbols, and only the PUSCH is still transmitted in another symbol. Consequently, it is inconvenient to detect the PUSCH, and the original power allocation manner is no longer applicable. The original manner of carrying the scheduling request on the PUSCH is not used in LTE because only one service is supported. However, in 5G NR, the plurality of service types are introduced, and periods of the service types are flexibly configured. Therefore, when a serving PUSCH is transmitted, another served scheduling request may be transmitted in any symbol. This is not considered in LTE. In a case in which the scheduling request and other UCI are carried on the PUCCH and are jointly encoded, the scheduling request needs to be obtained in advance for encoding in LTE. The joint encoding solution in LTE cannot support the scheduling request with the comparatively low delay, and therefore cannot satisfy a requirement.

The disclosure is intended to resolve the problem that the PUCCH carrying only the scheduling request collides with the another uplink channel on the same time domain resource. The PUCCH carrying only the scheduling request is a short-duration PUCCH, and the another uplink channel includes a PUSCH and a PUCCH. The PUCCH further includes three types: a long-duration PUCCH, a short-duration PUCCH with a length of one symbol, and a short-duration PUCCH with a length of two symbols.

Specifically, when the short-duration PUCCH carrying only the scheduling request collides with the PUSCH on some time domain resources, there are two cases to be discussed. In a first case, the two channels are simultaneously transmitted and a power is allocated. In a second case, only one of the two channels is transmitted, to be specific, only the PUSCH is transmitted and the scheduling request information is carried on the PUSCH. When the short-duration PUCCH carrying only the scheduling request collides with another PUCCH on some time domain resources, there are also two cases to be discussed. In a first case, the two channels are simultaneously transmitted and a power is allocated. In a second case, only one channel is transmitted, and whether only the PUCCH carrying only the scheduling request is transmitted or only the another uplink channel is transmitted is determined based on some conditions.

In this application, a processing manner of solving a collision between the short-duration PUCCH carrying only the scheduling request and another channel includes the following parts:

(1) First, the disclosure provides a manner of jointly transmitting the short-duration PUCCH carrying only the scheduling request and the PUSCH, where the manner relates to simultaneous transmission in one or two start DMRS symbols on the PUSCH and simultaneous transmission in another symbol for carrying the data, and provides a limitation on a case in which simultaneous transmission can be performed.

(2) Then, the disclosure provides a manner of carrying the scheduling request on the PUSCH, provides a manner of transmitting the scheduling request in any symbol, and provides a method for improving reliability of the scheduling request in a frequency diversity manner.

(3) Finally, the disclosure provides a method for how to perform power allocation when the short-duration PUCCH carrying only the scheduling request collides with the another PUCCH, and a specific condition for transmitting only one of the channels.

For the problem that a time domain resource used for the short-duration PUCCH carrying only the scheduling request overlaps with a time domain resource used for the another channel, this application provides a first processing solution as follows:

The first processing solution is a processing manner of jointly transmitting the short-duration PUCCH carrying only the scheduling request and the PUSCH.

In this case, when sending the PUSCH, the terminal needs to simultaneously transmit the scheduling request, and uses the short-duration PUCCH to carry only the scheduling request. In this case, because the two channels are simultaneously transmitted, the terminal needs to allocate a power based on a configured priority. A part of the power is preferentially allocated to one channel, and a remaining power is allocated to the other channel for transmission. In a specific power allocation solution, whether the symbol for carrying the SR collides with the DMRS symbol or a symbol for carrying the data after the DMRS symbol needs to be considered.

When the PUSCH occupies only one DMRS symbol, and the scheduling request is transmitted in the symbol, a power is preferentially allocated to the short-duration PUCCH carrying the scheduling request, and a remaining power is allocated to the DMRS. In a manner, a transmit power in a subsequent symbol for carrying the data keeps the same as the transmit power for the DMRS part. In another manner, in a subsequent symbol for carrying the data, if a PT-RS is configured on the PUSCH, and the PUSCH does not collide with the short-duration PUCCH carrying the SR, the terminal may increase a transmit power for the data, and the transmit power for the data proportionally increases relative to the transmit power for the DMRS. The base station side may either identify a power increment, or obtain a power increment by comparing a difference between a power for the PT-RS and the power for the DMRS on a same frequency domain resource.

When the PUSCH occupies two DMRS symbols, and the scheduling request is transmitted in the $1^{st}$ DMRS symbol, a part of a power is allocated to the short-duration PUCCH carrying the scheduling request, and a remaining power is allocated to the DMRS. A power in the $2^{nd}$ DMRS symbol still keeps the same as a power in the $1^{st}$ DMRS symbol. In a manner, a transmit power in a subsequent symbol for carrying the data keeps the same as the transmit power for the DMRS part. In another manner, in a subsequent symbol for carrying the data, if a PT-RS is configured on the PUSCH, and the PUSCH does not collide with the short-duration PUCCH carrying the SR, the terminal may increase a transmit power for the data, and the transmit power for the data proportionally increases relative to the transmit power for the DMRS. The base station side may either identify a power increment, or obtain a power increment by comparing a difference between a power for the PT-RS and the power for the DMRS on a same frequency domain resource.

Figure 11:
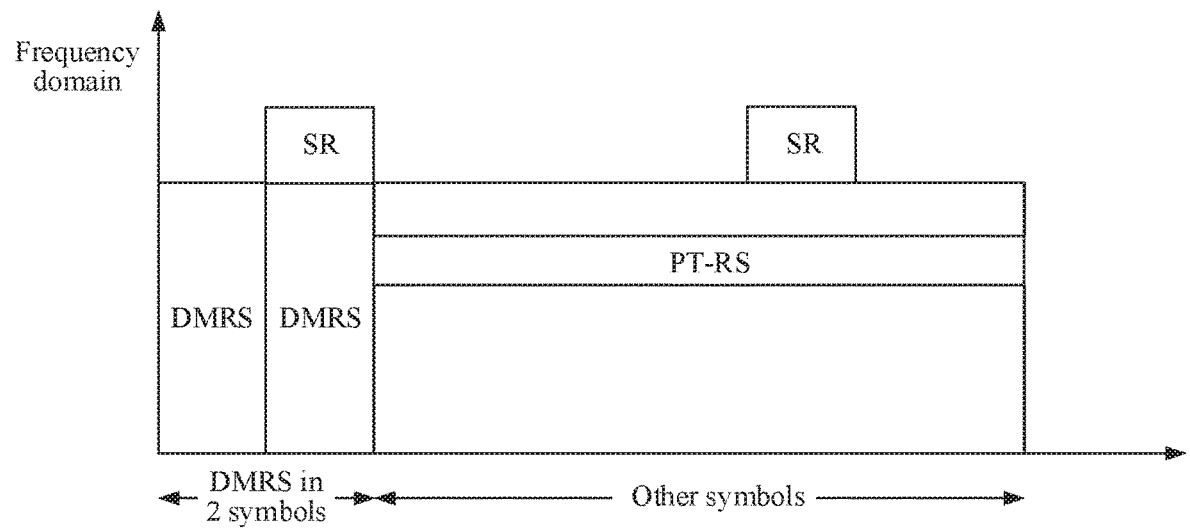
FIG. 11 and FIG. 12 each are a schematic diagram of a structure for simultaneously transmitting a PUSCH and a PUCCH carrying only an SR according to an embodiment of this application.

When the PUSCH occupies two DMRS symbols, and the scheduling request is transmitted in the $2^{nd}$ DMRS symbol, as shown in FIG. 11, a part of a power is allocated to the DMRS to ensure that a power for the $2^{nd}$ DMRS is the same as a power for the $1^{st}$ DMRS, and a remaining power is allocated to the short-duration PUCCH carrying the scheduling request. In a manner, a transmit power in a subsequent symbol for carrying the data keeps the same as the transmit power for the DMRS part. Because the two DMRS symbols are used for channel measurement on a plurality of ports, if powers for the two DMRS symbols are different, interference is caused between the plurality of ports. In another manner, in a subsequent symbol for carrying the data, if a PT-RS is configured on the PUSCH, and the PUSCH does not collide with the short-duration PUCCH carrying the SR, the terminal may increase a transmit power for the data, and the transmit power for the data proportionally increases relative to the transmit power for the DMRS. The base station side may either identify a power increment, or obtain a power increment by comparing a difference between a power for the PT-RS and the power for the DMRS on a same frequency domain resource.

Figure 12:
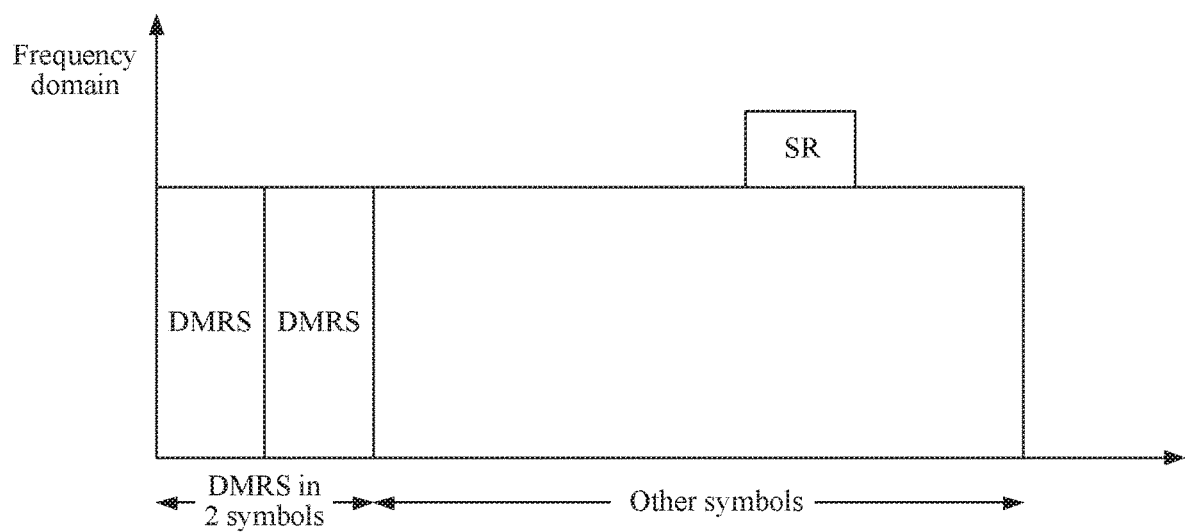

When the scheduling request and the PUSCH are transmitted in a symbol used for carrying the data, as shown in FIG. 12, if a PT-RS is configured on the PUSCH, a power is preferentially allocated to the short-duration PUCCH carrying the scheduling request, and a remaining power is allocated to the PUSCH. The base station side may either identify a value of a power, or obtain a value of a power for the PUSCH part in the symbol by comparing powers for the PT-RS carried on a frequency domain resource in different symbols before and after the symbol. If no PT-RS is configured on the PUSCH, a power is preferentially allocated to the PUSCH, and a remaining power is allocated to the short-duration PUCCH carrying the scheduling request. When a power for the PUSCH in some symbols decreases, a decoding error occurs if the base station does not know a power decrement.

When no PT-RS is included on the PUSCH, if the scheduling request is transmitted in the $1^{st}$ symbol for carrying the DMRS, a power is preferentially allocated to the short-duration PUCCH carrying the scheduling request, and a remaining power is allocated to the DMRS. Because there is no PT-RS, the base station cannot accurately estimate a power increment on the PUSCH, and a power for the PUSCH in a symbol used for carrying the data keeps the same as the power for the DMRS. If the scheduling request is transmitted on the PUSCH in the symbol used for carrying the data, because there is no PT-RS, the base station cannot accurately estimate a power variation, a power in the data symbol should keep the same as a power required for the PUSCH, and a remaining power is allocated to the short-duration PUCCH carrying the scheduling request.

In another case, if the base station is capable of estimating a power variation caused to the PUSCH due to simultaneous transmission of the PUSCH and the short-duration PUCCH carrying the SR, in other words, if the base station has a capability, when the scheduling request is transmitted in the symbol that is on the PUSCH and that is used for carrying the data, during transmission, the terminal preferentially allocates a power to the short-duration PUCCH carrying the scheduling request, and allocates a remaining power to the PUSCH.

For the problem that a time domain resource used for the short-duration PUCCH carrying only the scheduling request overlaps with a time domain resource used for the another channel, this application provides a second processing solution as follows:

In the second processing manner, only one of the two channels is transmitted. To be specific, only the PUSCH is transmitted, and the SR is carried on the PUSCH for transmission.

A structure of the PUSCH includes one or two DMRS symbols and a subsequent symbol for carrying uplink data. A PT-RS may or may not be configured in the subsequent symbol for carrying the uplink data. To support a case in which the scheduling request may be transmitted in any symbol, a corresponding resource needs to be reserved on the PUSCH in each symbol. The following separately describes two cases in which the PUSCH occupies a symbol for carrying the DMRS and the PUSCH occupies a symbol for carrying the uplink data.

When the PUSCH occupies only one DMRS symbol and the scheduling request is transmitted in the DMRS symbol, the terminal adds the SR by using a sequence different from a sequence used for transmitting the DMRS, where the SR and the DMRS are orthogonal in the entire frequency band of the PUSCH or in frequency bands used for the SR and the DMRS. Optionally, the terminal preferentially provides a power for the SR, and provides a remaining power for transmitting the DMRS. In a symbol after the DMRS symbol, if the PT-RS is configured, the terminal may increase a power for the PUSCH to a power required for the PUSCH. If no PT-RS is configured, a transmit power for the PUSCH in a subsequent symbol keeps the same as a transmit power in the DMRS symbol.

When the PUSCH occupies two DMRS symbols and the scheduling request is transmitted in a symbol for carrying the DMRS, if there is an SR requirement in the $1^{st}$ DMRS symbol, the terminal preferentially provides a power for the SR, and provides a power for the DMRS in the $2^{nd}$ symbol the same as a power for the DMRS in the $1^{st}$ symbol: or if there is an SR requirement in the $2^{nd}$ DMRS symbol, the terminal preferentially ensures that a power for the DMRS is the same as a power in the $1^{st}$ symbol, and allocates a remaining power for transmitting the SR. In the foregoing two cases, the sequence used for the SR is different from or orthogonal to the sequence used for the DMRS.

When the scheduling request is transmitted in an uplink data symbol included on the PUSCH, to support the SR with a period of X symbols ($X \geq 1$), a resource needs to be reserved every X symbols. To be specific, at least one resource element (resource element. RE) is reserved every X symbols to carry the SR. When there is no SR, a transmit power for the reserved resource is 0. When there is the SR, a transmit power for the reserved resource is not 0. Specifically, a resource is reserved every X symbols, and there are a plurality of RE allocation manners.

Manner 1: In a single symbol, an RE adjacent to the PT-RS is allocated to the SR.

Specifically, the scheduling request with the period of X symbols is carried in the symbol for carrying the data on the PUSCH. One resource is reserved every X symbols to carry the SR, and the reserved resource includes one RE or at least two consecutive REs.

Figure 13:
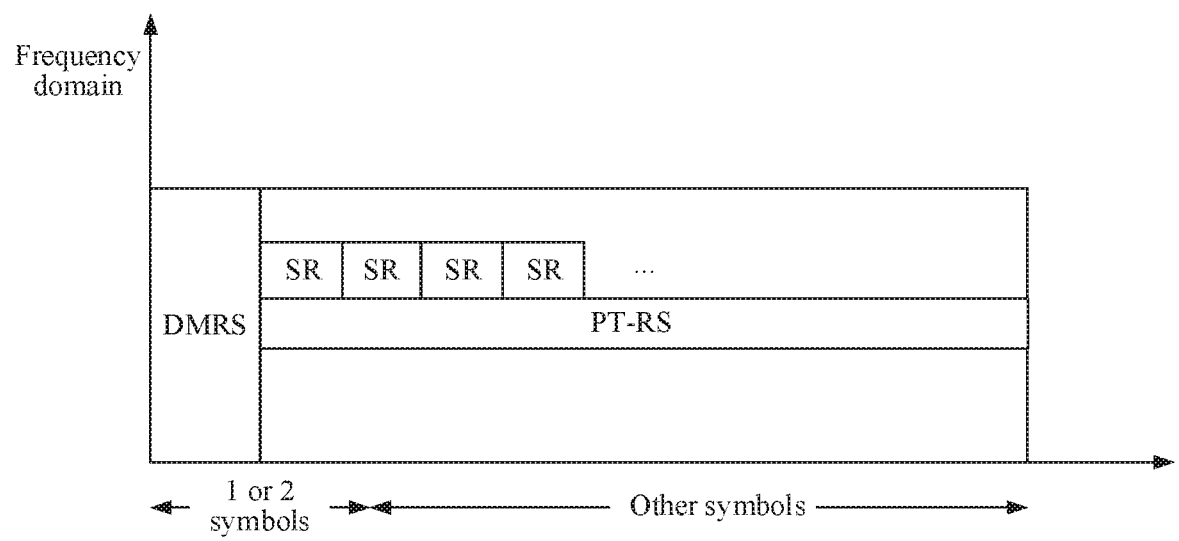
FIG. 13, FIG. 14(a) and FIG. 14(b), FIG. 15(a) and FIG. 15(b), and FIG. 16(a) to FIG. 16(c) each are a schematic diagram of a structure for carrying an SR on a PUSCH according to an embodiment of this application.

Optionally, when the PT-RS is configured, the RE may be the RE adjacent to the PT-RS. As shown in FIG. 13, X=1, and one resource is reserved for the SR in each symbol.

Figure 14A:
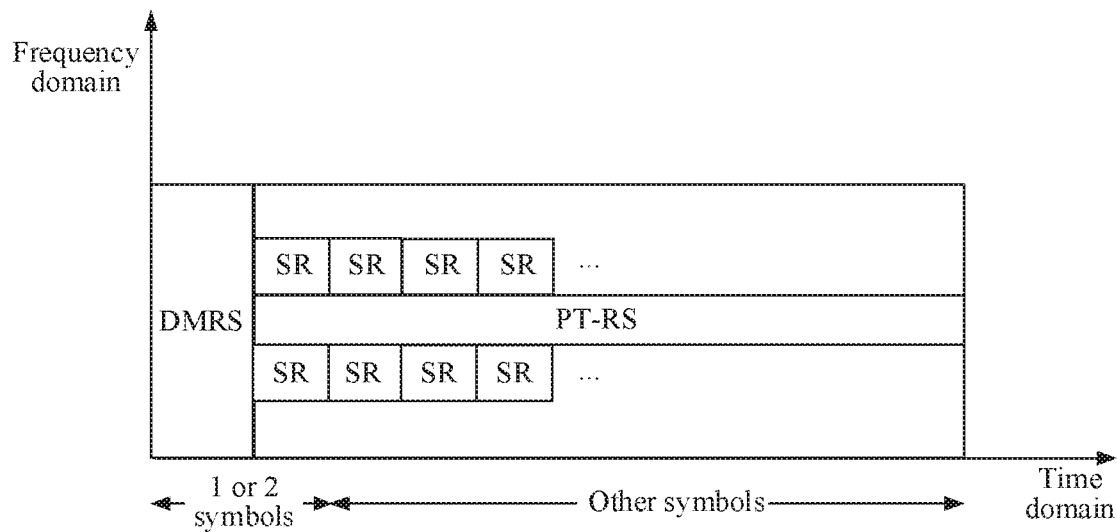
Figure 14B:
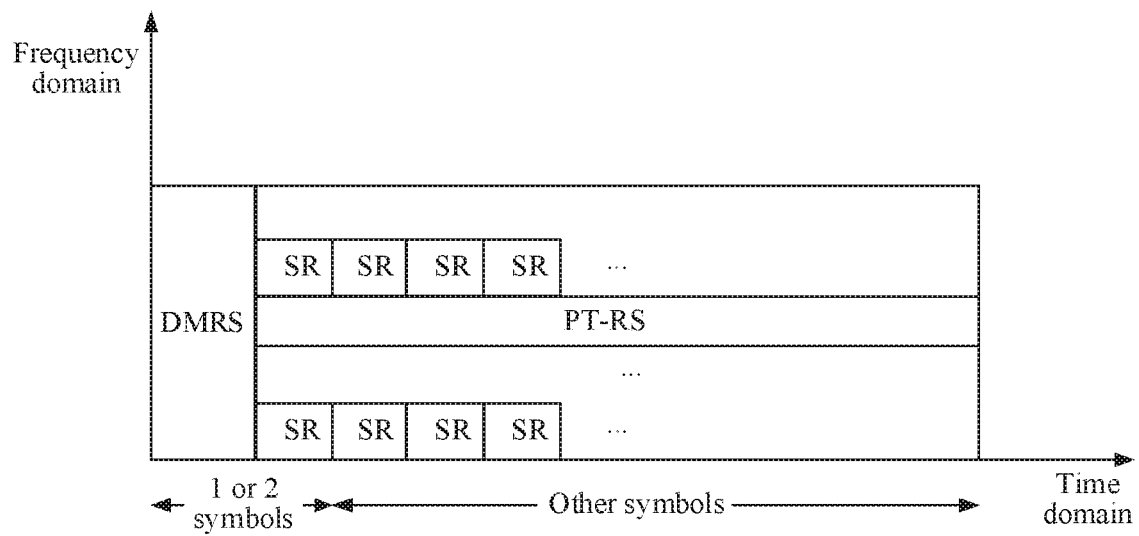

Optionally, to further improve transmission reliability, at least two resources may be allocated for carrying the scheduling request. In a manner, as shown in FIG. 14(a), the SR period X=1, two resources are reserved for the SR in each symbol, each resource includes one RE or at least two consecutive REs, and the REs used for carrying the scheduling request are located on two sides of a frequency domain resource used for carrying the PT-RS. Alternatively, as shown in FIG. 14(b), the REs used for carrying the scheduling request may be located on one side of a frequency domain resource used for carrying the PT-RS or on one side of the frequency band occupied by the PUSCH.

Manner 2: In a single symbol. REs on two sides of the frequency band occupied by the PUSCH are allocated to the SR.

Specifically, the scheduling request with the period of X symbols is carried in the symbol for carrying the data on the PUSCH. One or more resources are reserved every X symbols to carry the SR, and each of the reserved resources includes one RE or at least two consecutive REs. When no PT-RS is configured, the REs may be located on one side or two sides of the frequency band occupied by the PUSCH.

Figure 15A:
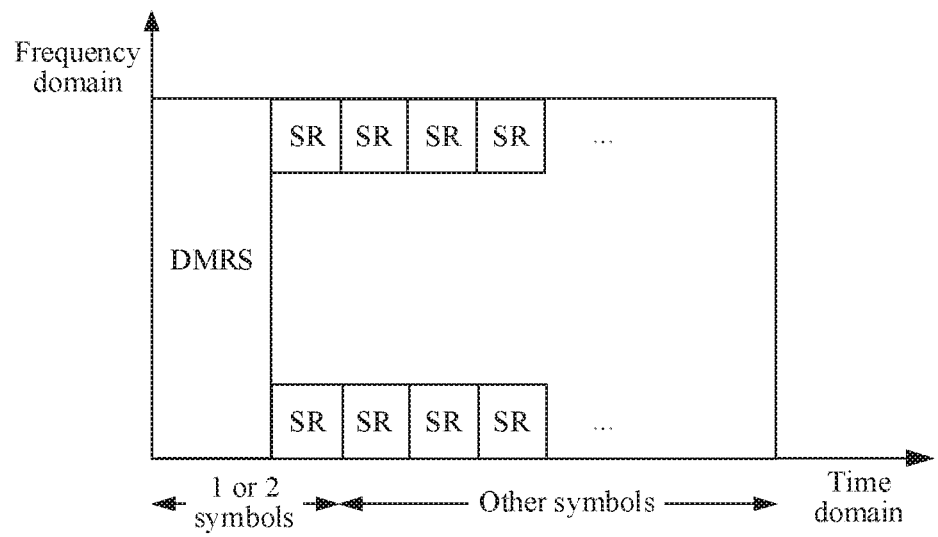
Figure 15B:
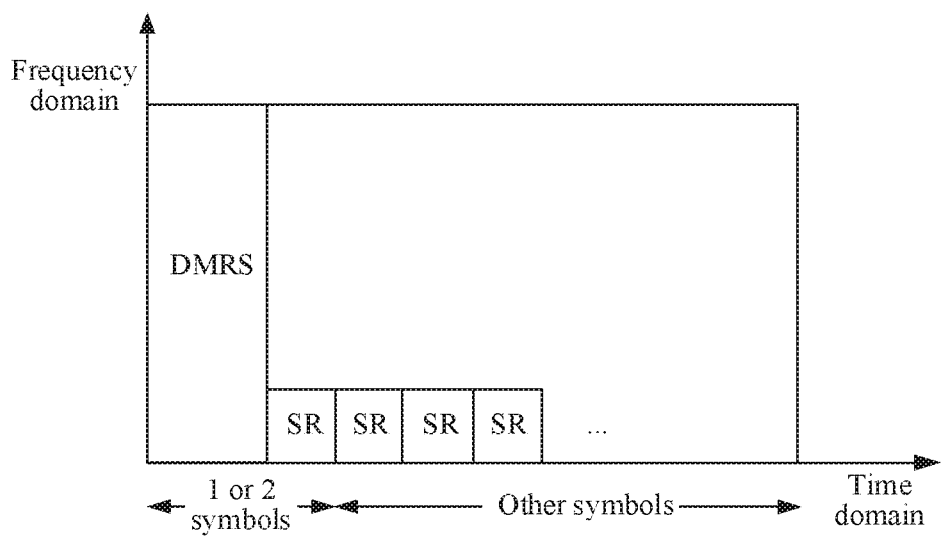

As shown in FIG. 15(a), the SR period X=1, two resources are reserved for the SR in each symbol, each resource includes one RE or at least two consecutive REs, and the REs used for carrying the scheduling request are located on two sides of the frequency band occupied by the PUSCH. As shown in FIG. 15(b), the SR period X=1, one resource is reserved for the SR in each symbol, each resource includes one RE or at least two consecutive REs, and the RE used for carrying the scheduling request is located on one side of the frequency band occupied by the PUSCH.

Manner 3: REs are allocated to the SR in a plurality of symbols.

Specifically, the REs are allocated to the SR in the plurality of symbols on the PUSCH based on the SR period, and the REs used for carrying the SR are located on different frequency domain resources in at least two adjacent symbols. One resource or two resources may be reserved for the SR in a single symbol.

Figure 16A:
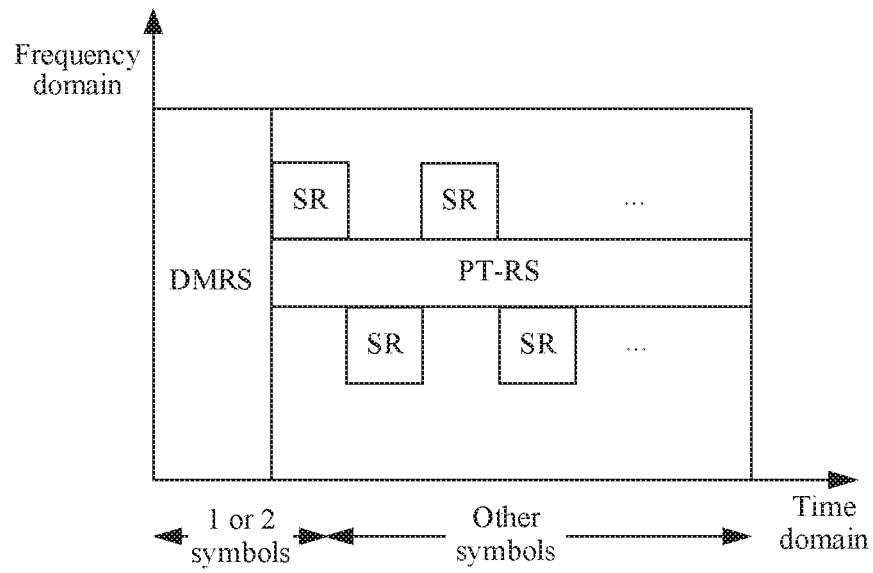
Figure 16B:
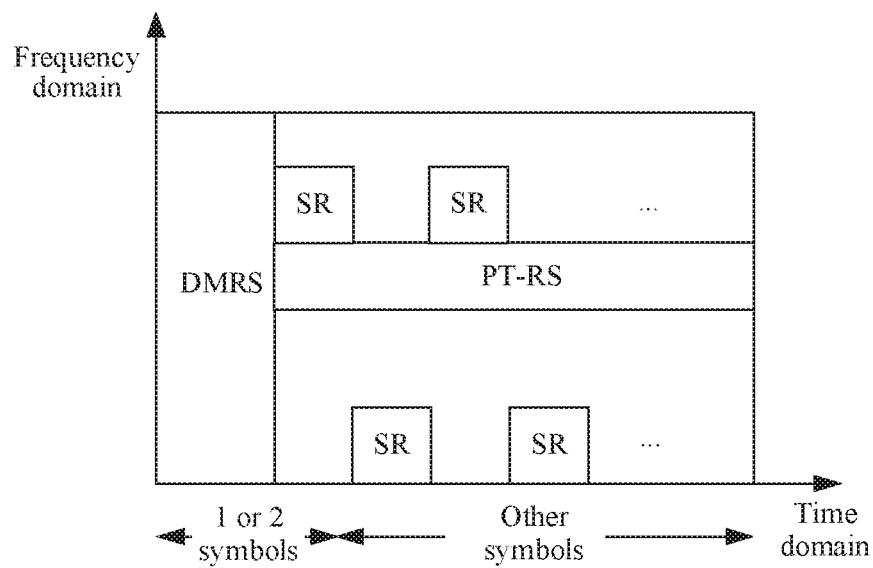
Figure 16C:
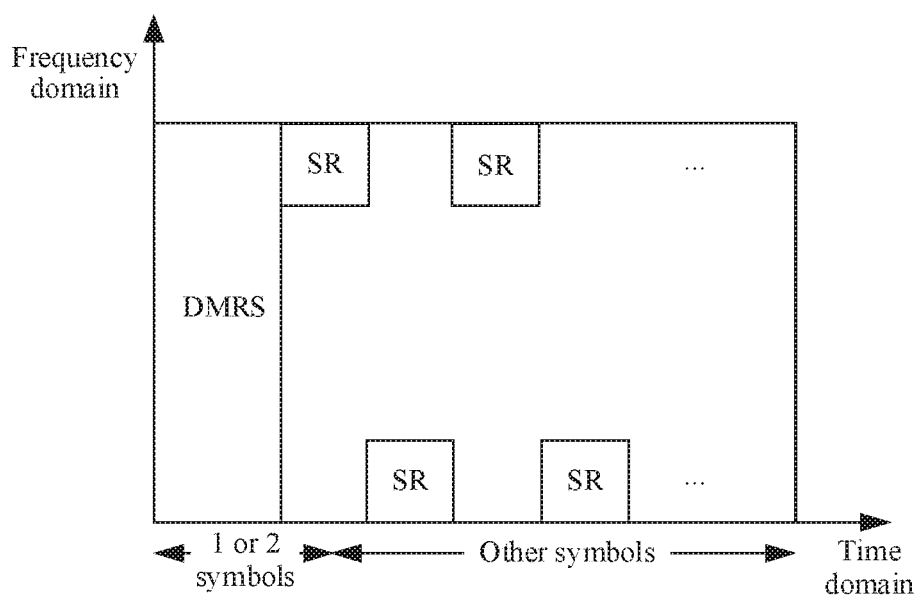

Optionally, if the SR period X=1 or 2, a resource is reserved for the SR in each symbol. As shown in FIG. 16(a), in two adjacent symbols, an RE that is used for carrying the scheduling request in a first symbol is located on one side of a frequency domain resource used for carrying the PT-RS, and an RE used for carrying the scheduling request in a second symbol is located on the other side of the PT-RS. As shown in FIG. 16(b), an RE used for carrying the scheduling request in a first symbol is located on one side of a frequency domain resource used for carrying the PT-RS, and an RE used for carrying the scheduling request in a second symbol is located on one side of the PUSCH. As shown in FIG. 16(c), an RE used for carrying the scheduling request in a first symbol is located on one side of the PUSCH, and an RE used for carrying the scheduling request in a second symbol is located on the other side of the PUSCH. Compared with Manner 2, this scheduling manner still achieves a diversity gain effect when there are relatively few RE resources.

For the problem that a time domain resource used for the short-duration PUCCH carrying only the scheduling request overlaps with a time domain resource used for the another channel, this application provides a third processing solution as follows:

The third processing solution is a processing manner of jointly transmitting the short-duration PUCCH carrying only the scheduling request and the another PUCCH or selecting and transmitting one of the short-duration PUCCH and the another PUCCH.

Case 1: A processing manner used when the PUCCH carrying only the SR collides with a long-duration PUCCH is provided.

In this case, the short-duration PUCCH carrying only the scheduling request and the long-duration PUCCH are simultaneously transmitted, and information carried on the long-duration PUCCH herein may be information other than the scheduling request, such as an ACK/a NACK, a channel quality indicator (channel quality indicator, CQI), and CSI, or may include the scheduling request and other information such as an ACK/a NACK, a CQI, and CSI. In other words, a case in which only the scheduling request is carried on the long-duration PUCCH is not included.

As shown in FIG. 17, a time domain symbol on the long-duration PUCCH overlaps in time domain with a time domain symbol on the short-duration PUCCH carrying only the SR. The long-duration PUCCH is classified into two types: a long-duration PUCCH on which an OCC is used to perform multi-user multiplexing and a long-duration PUCCH on which an OCC is not used to perform multi-user multiplexing. When the OCC is used, because different users need to cancel interference from other users by using different codewords, a requirement for a power in each symbol keeps unchanged.

When an OCC code whose length is greater than or equal to 2 is used on the long-duration PUCCH for capacity expansion in a DMRS symbol and a UCI symbol, and a time domain resource used for the short-duration PUCCH carrying only the SR is the same as a start symbol on the long-duration PUCCH or a start symbol on any frequency hopping part on the long-duration PUCCH, the terminal simultaneously transmits the long-duration PUCCH and the short-duration PUCCH carrying only the SR, preferentially allocates a power to the short-duration PUCCH carrying only the SR, and allocates a remaining power (if any) to the long-duration PUCCH. Optionally, after transmission of the short-duration PUCCH carrying only the SR ends, when the terminal proceeds to transmit the long-duration PUCCH, a power for the long-duration PUCCH in a current slot or on a frequency hopping part keeps the same as a transmit power for the long-duration PUCCH in simultaneous transmission.

When an OCC code whose length is greater than or equal to 2 is used on the long-duration PUCCH for capacity expansion in a DMRS symbol and a UCI symbol, and a time domain resource used for the short-duration PUCCH carrying only the SR is the same as a symbol on another location on the long-duration PUCCH, after ensuring that a power on the long-duration PUCCH keeps unchanged, the terminal transmits, by using a remaining power, the short-duration PUCCH carrying only the SR.

When an OCC is not configured for the long-duration PUCCH, the UE preferentially allocates a power to ensure transmission of the short-duration PUCCH carrying only the SR, and allocates a remaining power to the long-duration PUCCH. When a power of the terminal cannot satisfy a requirement of simultaneous transmission of the two channels, the terminal stops transmitting the long-duration PUCCH. In other words, only the short-duration PUCCH carrying only the SR is transmitted on the overlapping time domain part of the two channels. After transmission of the short-duration PUCCH carrying only the SR ends, the terminal may determine, based on whether remaining symbols in which the long-duration PUCCH is not transmitted or symbols in which the long-duration PUCCH has been transmitted include both a DMRS symbol and a UCI symbol, whether to proceed to transmit the long-duration PUCCH. Specifically, the terminal proceeds to transmit the long-duration PUCCH only when the remaining symbols in which the long-duration PUCCH is not transmitted or the symbols in which the long-duration PUCCH has been transmitted include both the DMRS symbol and the UCI symbol on a frequency domain resource, and does not proceed to transmit the long-duration PUCCH when there are no DMRS symbol and UCI symbol on a same frequency domain resource.

For example, when an OCC is not configured for the long-duration PUCCH, only the short-duration PUCCH carrying only the SR is transmitted on the overlapping time domain part of the two channels. After transmission of the short-duration PUCCH carrying only the SR ends, if the symbols in which the long-duration PUCCH has been transmitted and the remaining symbols in which the long-duration PUCCH is not transmitted include both a DMRS symbol and a UCI symbol, the terminal may proceed to transmit the long-duration PUCCH.

For example, when the long-duration PUCCH includes a plurality of slots, only the short-duration PUCCH carrying only the SR is transmitted on the overlapping time domain part of the two channels. After transmission of the short-duration PUCCH carrying only the SR ends, if there is an entire slot in which transmission is not performed, the terminal may proceed to transmit the long-duration PUCCH.

Case 2: A processing manner used when the PUCCH carrying only the SR collides with a short-duration PUCCH is provided.

As shown in FIG. 18, in this case, the short-duration PUCCH carrying only the scheduling request and the short-duration PUCCH are simultaneously transmitted, and information carried on the short-duration PUCCH may be information other than the scheduling request, such as an ACK/a NACK, CSI, and a CQI. Alternatively, information carried on the short-duration PUCCH may include the scheduling request and other control information such as an ACK/a NACK, CSI, and a CQI. In other words, a case in which only the scheduling request is carried on the short-duration PUCCH is not included. The short-duration PUCCH may be further classified into three types: a short-duration PUCCH with a single symbol, a short-duration PUCCH with two symbols for performing joint encoding, and a short-duration PUCCH on which an OCC is enabled by using two symbols. The short-duration PUCCH herein on which the OCC is enabled by using two symbols needs to be separately analyzed. Because the OCC is used to perform multi-user multiplexing, if energy of one of the symbols is affected due to simultaneous transmission, interference between a plurality of users is caused.

Cases in which the short-duration PUCCH with a single symbol or the short-duration PUCCH on which two symbols are jointly encoded is transmitted in a frequency hopping manner (an OCC is not used during frequency hopping transmission because frequency domain resources are different) are as follows:

(1) If the short-duration PUCCH carries only CQI information, a power is preferentially ensured for the short-duration PUCCH carrying only the SR, and a remaining power (if any) is allocated to the short-duration PUCCH carrying the CQI. In other words, a priority of the SR is higher than a priority of the CQI.

(2) If the short-duration PUCCH carries both the SR and other information, based on a priority (a service type, a period value, and the like) of the SR carried on each of the two channels, the terminal preferentially allocates a power to a channel carrying the SR with a higher priority and allocates a remaining power (if any) to the other channel.

(3) If the short-duration PUCCH carries an ACK/a NACK (or an ACK/a NACK and CSI), the terminal equally allocates a power to the two channels, or based on priorities of the ACK/NACK and the SR, the terminal preferentially allocates a power to a channel with a higher transmission priority and allocates a remaining power (if any) to the other channel.

(4) If the short-duration PUCCH carries an ACK/a NACK (or an ACK/a NACK and CSI), the terminal may allocate a power based on a ratio of an information amount of the ACK/NACK to an information amount of the SR (which is denoted as 1 bit).

In a case in which the short-duration PUCCH with two symbols is used to enable the OCC: When the short-duration PUCCH carrying only the SR is transmitted in a first symbol on the short-duration PUCCH with two symbols, the two channels are simultaneously transmitted. In this case, a power is allocated based on the foregoing four cases. To be specific, a power is preferentially allocated to a channel with a higher transmission priority, and a remaining power (if any) is allocated to the other channel. When the short-duration PUCCH carrying only the SR is transmitted in a second symbol on the short-duration PUCCH with two symbols, the two channels are simultaneously transmitted. In this case, it is preferentially ensured that a power in the second symbol on the short-duration PUCCH with two symbols is the same as a power in the first symbol on the short-duration PUCCH with two symbols, and a remaining power is allocated to the short-duration PUCCH carrying only the SR.

An embodiment of this application provides an uplink transmission apparatus. The uplink transmission method and the uplink transmission apparatus that are provided in the embodiments of this application are based on a same inventive concept. Because problem-resolving principles of the method and the apparatus are similar, mutual reference may be made between implementations of the apparatus and the method, and no repeated description is provided.

Based on a same concept, this application provides the foregoing terminal, and the foregoing terminal is configured to perform the method steps related to the terminal in the embodiments of this application. In a possible design, the terminal includes a plurality of functional modules, configured to perform the method steps related to the terminal in the embodiments of this application.

Figure 19:
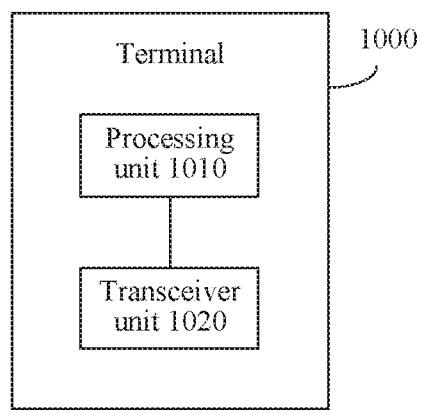
FIG. 19 is a schematic structural diagram of a terminal according to an embodiment of this application.

As shown in FIG. 19, the terminal 1000 includes a processing unit 1010 and a transceiver unit 1020. It should be noted that an operation performed by the processing unit 1010 or the transceiver unit 1020 may be considered as an operation of the terminal 1000.

In a possible design, a structure of the terminal includes a processor and a transceiver. The processor is configured to support the terminal to perform a corresponding function in the foregoing method. The transceiver is configured to: support communication between the terminal and a base station, and send information or an instruction in the foregoing method embodiment to the base station. The terminal may further include a memory. The memory is configured to be coupled to the processor and store a program instruction and data that are necessary for the terminal. The processing unit 1010 on the terminal 1000 may be implemented by the processor on the terminal 1000, and the transceiver unit 1020 may be implemented by the transceiver on the terminal 1000.

In a first embodiment, the processing unit 1010 is configured to: transmit a first uplink channel on a first time domain resource by using a first transmit power, and transmit a second uplink channel on the first time domain resource by using a second transmit power, where the first uplink channel occupies the first time domain resource to transmit a scheduling request SR, and the first time domain resource is the same as some time domain resources occupied by the second uplink channel, or the first time domain resource is the same as all time domain resources occupied by the second uplink channel.

In a possible design, the first time domain resource corresponds to one resource element or at least two consecutive resource elements.

In a possible design, if the second uplink channel is a physical uplink shared channel, when the first time domain resource is the same as a time domain resource used for carrying the $1^{st}$ demodulation reference signal DMRS on the physical uplink shared channel, the first transmit power is not less than a transmit power required for the SR, and the second transmit power is a difference between a total transmit power of the terminal on the first time domain resource and the first transmit power.

In a possible design, if the second uplink channel is a physical uplink shared channel, when the first time domain resource is the same as a time domain resource used for carrying the $2^{nd}$ DMRS on the physical uplink shared channel, the second transmit power is the same as a transmit power for the $1^{st}$ DMRS, and the first transmit power is a difference between a total transmit power of the terminal on the first time domain resource and the second transmit power.

In a possible design, if the second uplink channel is a physical uplink shared channel, when the first time domain resource is the same as a time domain resource used for carrying data on the physical uplink shared channel, and a phase tracking reference signal PT-RS is also carried on the time domain resource used for carrying the data, the first transmit power is not less than a transmit power required for the SR, and the second transmit power is a difference between a total transmit power of the terminal on the first time domain resource and the first transmit power.

In a possible design, if the second uplink channel is a physical uplink shared channel, when the first time domain resource is the same as a time domain resource used for carrying data on the physical uplink shared channel, and no PT-RS is carried on the time domain resource used for carrying the data, the second transmit power is the same as a transmit power on a time domain resource used for carrying a DMRS on the physical uplink shared channel, and the first transmit power is a difference between a total transmit power of the terminal on the first time domain resource and the second transmit power.

In a possible design, if both the first uplink channel and the second uplink channel are physical uplink control channels, when an orthogonal cover code OCC is used for the second uplink signal, and the first time domain resource is the same as a start time domain resource used for the second uplink channel or a start time domain resource used for the second uplink channel in frequency hopping, the first transmit power is not less than the transmit power required for the SR, and the second transmit power is the difference between the total transmit power of the terminal on the first time domain resource and the first transmit power.

In a possible design, if both the first uplink channel and the second uplink channel are physical uplink control channels, when the OCC is used for the second uplink signal, and the first time domain resource is the same as a time domain resource after a start time domain resource used for the first uplink channel or a time domain resource after a start time domain resource used for the first uplink channel in frequency hopping, the second transmit power is the same as a transmit power of the terminal on the start time domain resource, and the first transmit power is the difference between the total transmit power of the terminal on the first time domain resource and the second transmit power.

In a possible design, if both the first uplink channel and the second uplink channel are physical uplink control channels, when the OCC is not used for the second uplink signal, the first transmit power is not less than the transmit power required for the SR, and the second transmit power is the difference between the total transmit power of the terminal on the first time domain resource and the first transmit power.

In a possible design, if both the first uplink channel and the second uplink channel are physical uplink control channels, and the second uplink channel is transmitted in a frequency hopping manner, the first transmit power is not less than a transmit power required for the first uplink channel.

In a possible design, if both the first uplink channel and the second uplink channel are physical uplink control channels, and the second uplink channel is transmitted in a frequency hopping manner, the second transmit power is the difference between the total transmit power of the terminal on the first time domain resource and the first transmit power.

In a possible design, if both the first uplink channel and the second uplink channel are physical uplink control channels, and the second uplink channel is transmitted in a frequency hopping manner, the second transmit power is not less than a transmit power required for the second uplink channel, and the first transmit power is the difference between the total transmit power of the terminal on the first time domain resource and the second transmit power.

In a possible design, if both the first uplink channel and the second uplink channel are physical uplink control channels, and the second uplink channel is transmitted in a frequency hopping manner, the first transmit power is equal to the second transmit power.

In a possible design, if both the first uplink channel and the second uplink channel are physical uplink control channels, and the second uplink channel is transmitted in a frequency hopping manner, the first transmit power and the second transmit power are obtained by allocating the total power based on a ratio of an information amount of the SR to an information amount of uplink control information carried on the second uplink channel.

In a possible design, if both the first uplink channel and the second uplink channel are physical uplink control channels, and the orthogonal cover code OCC is used for the second uplink channel, when the first time domain resource is the same as the $1^{st}$ time domain resource used for the second uplink channel, the first transmit power is not less than the transmit power required for the first uplink channel, and the second transmit power is the difference between the total transmit power of the terminal on the first time domain resource and the first transmit power; or the second transmit power is not less than the transmit power required for the second uplink channel, and the first transmit power is the difference between the total transmit power of the terminal on the first time domain resource and the second transmit power.

In a possible design, if both the first uplink channel and the second uplink channel are physical uplink control channels, and the orthogonal cover code OCC is used for the second uplink channel, when the first time domain resource is the same as a time domain resource that is after the $1^{st}$ time domain resource and that is used for the second uplink channel, the second transmit power is the same as a transmit power on the $1^{st}$ time domain resource used for the second uplink channel, and the first transmit power is the difference between the total transmit power of the terminal on the first time domain resource and the second transmit power.

In a possible design, the processing unit 1010 is configured to: if the second transmit power is less than the transmit power required for the second uplink channel, transmit the SR on the first time domain resource; or if the first transmit power is less than the transmit power required for the first uplink channel, transmit the second uplink channel on the first time domain resource.

In a possible design, the processing unit 1010 is further configured to: after the SR is transmitted, if time domain resources on which the second uplink channel is not transmitted or has been transmitted include time domain resources respectively used for carrying the DMRS and the uplink control information, transmit the second uplink channel; or if time domain resources on which the second uplink channel is not transmitted or has been transmitted do not include time domain resources used for carrying the DMRS and the uplink control information, the transmit power for the second uplink channel is 0.

In a possible design, a transmit power of the terminal on a time domain resource in the time domain resources occupied by the second uplink channel other than the first time domain resource is the same as the second transmit power, or proportionally increases relative to the second transmit power.

In a second embodiment, the processing unit 1010 is configured to: send, by using the transceiver unit 1020, information by using a first time domain resource and a first frequency domain resource; and send, by using the transceiver unit 1020, a scheduling request SR by using a second time domain resource and a second frequency domain resource, where the information and the SR are carried on a physical uplink shared channel PUSCH, the information includes a demodulation reference signal DMRS and data, and all time domain resources of the second time domain resource are the same as all or some time domain resources of the first time domain resource, or some time domain resources of the second time domain resource are the same as all or some time domain resources of the first time domain resource.

In a possible design, all frequency domain resources of the second frequency domain resource are the same as all or some frequency domain resources of the first frequency domain resource, or some frequency domain resources of the second frequency domain resource are the same as all or some frequency domain resources of the first frequency domain resource.

In a possible design, the processing unit 1010 is configured to: when a time domain resource occupied by the DMRS is the same as a time domain resource occupied by the SR, on the same time domain resource occupied by the DMRS and the SR, send the DMRS by using a first sequence, and send the SR by using a second sequence, where the first sequence is different from the second sequence.

In a possible design, the processing unit 1010 is configured to: on the same time domain resource occupied by the DMRS and the SR, send the DMRS by using a first transmit power, and send the SR by using a second transmit power.

In a possible design, when the processing unit 1010 does not use the second time domain resource and the second frequency domain resource to send the SR the second transmit power is 0, and the first transmit power is not less than a transmit power required for the DMRS.

In a possible design, there are two DMRSs; and when the second time domain resource is the same as a time domain resource occupied by the $1^{st}$ DMRS, the second transmit power is not less than a transmit power required for transmitting the SR, and the first transmit power is a difference between a total transmit power of the terminal on the second time domain resource and the second transmit power; or when the second time domain resource is the same as a time domain resource occupied by the $2^{nd}$ DMRS, the first transmit power is the same as a transmit power for the $1^{st}$ DMRS, and the second transmit power is a difference between a total transmit power of the terminal on the second time domain resource and the first transmit power.

In a possible design, when a time domain resource occupied by the data is the same as the time domain resource occupied by the SR, in resources corresponding to the same time domain resource occupied by the data and the SR, a resource occupied by the data is different from a resource occupied by the SR.

In a possible design, a frequency of the resource occupied by the SR is greater than or equal to a minimum frequency of the resource occupied by the data, and a frequency of the resource occupied by the data is less than or equal to a maximum frequency of the resource occupied by the data.

In a possible design, the resource occupied by the SR includes one or more resource groups, and each resource group includes one resource element or at least two consecutive resource elements.

In a possible design, when the resource occupied by the SR includes a plurality of resource groups, there is an interval of at least one resource element between different resource groups.

In a possible design, the adjacent resource groups on a time domain resource are located on different frequency domain resources.

In a possible design, if the information further includes a phase tracking reference signal, at least one of the resource groups is adjacent to a frequency domain resource used for the phase tracking reference signal.

In a possible design, a structure of the terminal includes a processor and a transceiver. The processor is configured to support the terminal to perform a corresponding function in the foregoing method. The transceiver is configured to: support communication between the terminal and a base station, and send information or an instruction in the foregoing method embodiment to the base station. The terminal may further include a memory. The memory is configured to be coupled to the processor and store a program instruction and data that are necessary for the terminal.

Figure 20:
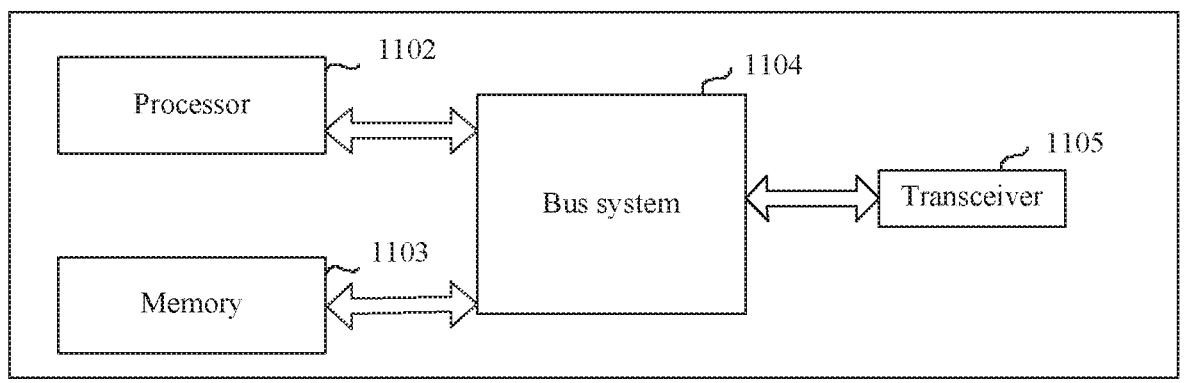
FIG. 20 is a schematic structural diagram of a terminal according to an embodiment of this application.

It should be noted that a structure relationship of the transceiver, the processor, the memory, and a bus system that are included in the terminal in this embodiment of this application is shown in FIG. 20. The transceiver 1105 in FIG. 20 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof.

The processor 1102 in this embodiment of this application may be a central processing unit (CPU), a (NP), or a combination of the CPU and the NP. The processor may further include a hardware chip. The hardware chip may be an application-specific integrated circuit (ASIC), a programmable logic device (PLD), or a combination thereof The PLD may be a complex PLD (CPLD), a field programmable gate array (FPGA), generic array logic (GAL), or any combination thereof. The memory 1103 may include a volatile memory, for example, a random access memory (RAM); or the memory 1103 may include a non-volatile memory, for example, a read-only memory (ROM), a flash memory, a hard disk drive (HDD), or a solid-state drive (SSD); or the memory 1103 may include a combination of the foregoing memories.

In this embodiment of this application, a bus system 1104 may further be included. The bus system 1104 may include any quantity of interconnected buses and bridges. Specifically, a circuit of one or more processors 1102 represented by the processor and a circuit of a memory represented by the memory 1103 are connected together. Other circuits such as a peripheral device, a voltage stabilizer, and a power management circuit may also be connected by using a bus. This is not further described in this application. The transceiver 1105 provides a unit for communicating with various other devices on a transmission medium. The processor 1102 is responsible for managing a bus architecture and common processing. The memory 1103 may store data used when the processor 1102 is performing an operation.

Based on a same inventive concept, to achieve the foregoing invention objectives, an embodiment of this application further provides a chip. The chip is connected to a memory, and is configured to read and execute a software program stored in the memory, to implement the method steps related to the terminal in the embodiments of this application.

Figure 21:
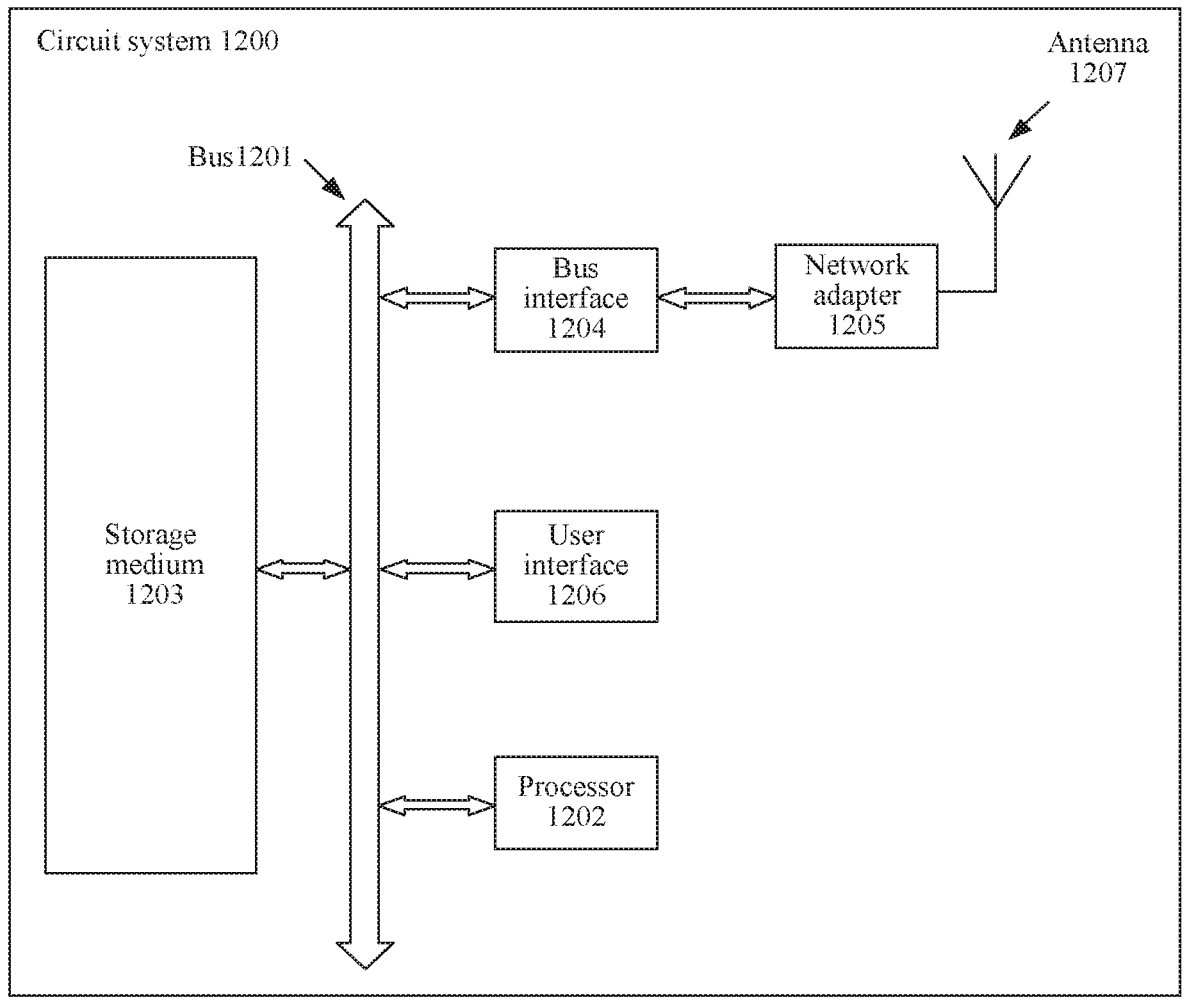
FIG. 21 is a schematic structural diagram of a data transmission apparatus according to an embodiment of this application.

Based on a same inventive concept, an embodiment of this application further provides a circuit system. FIG. 21 is a schematic structural diagram of the circuit system (for example, a communications apparatus such as an access point, a base station, a station, or a terminal, or a chip in the foregoing communications apparatus) according to an embodiment of the disclosure.

As shown in FIG. 21, the circuit system 1200 may be implemented by using a bus 1201 as a general bus architecture. The bus 1201 may include any quantity of interconnected buses and bridges based on specific application and an overall design constraint condition of the circuit system 1200. The bus 1201 connects various circuits together, and these circuits include a processor 1202, a storage medium 1203, and a bus interface 1204. Optionally, the circuit system 1200 uses the bus interface 1204 to connect a network adapter 1205 and the like by using the bus 1201. The network adapter 1205 may be configured to implement a signal processing function at a physical layer on a wireless communications network, and send and receive a radio frequency signal by using an antenna 1207. A user interface 1206 may be connected to a user terminal such as a keyboard, a display, a mouse, or a joystick. The bus 1201 may further connect various other circuits such as a timing source, a peripheral device, a voltage regulator, or a power management circuit. These circuits are well-known in the art, and are not described in detail herein.

Alternatively, the circuit system 1200 may be configured as a system on chip. The system on chip includes one or more microprocessors that provide a processor function, and an external memory that provides at least a part of the storage medium 1203. All the components are connected to another support circuit by using an external bus architecture.

Alternatively, the circuit system 1200 may be implemented by using an ASIC (application-specific integrated circuit) that includes the processor 1202, the bus interface 1204, and the user interface 1206, and at least a part that is of the storage medium 1203 and that is integrated into a single chip. Alternatively, the circuit system 1200 may be implemented by using one or more FPGAs (field programmable gate arrays), a PLD (programmable logic device), a controller, a state machine, gate logic, a discrete hardware component, any other appropriate circuit, or any combination of circuits that can perform various functions described throughout the disclosure.

The processor 1202 is responsible for managing the bus and general processing (including executing software stored in the storage medium 1203). The processor 1202 may be implemented by using one or more general-purpose processors and/or dedicated processors. For example, the processor includes a microprocessor, a microcontroller, a DSP processor, and another circuit that can execute software. The software should be broadly construed as representing an instruction, data, or any combination thereof, regardless of whether the software is referred to as software, firmware, middleware, microcode, a hardware description language, or the like.

In the figure, the storage medium 1203 is separated from the processor 1202. However, a person skilled in the art easily understands that the storage medium 1203 or any part thereof may be located outside the circuit system 1200. For example, the storage medium 1203 may include a transmission line, a carrier waveform modulated by using data, and/or a computer product separated from a wireless node. These media are accessible by the processor 1202 by using the bus interface 1204. Alternatively, the storage medium 1203 or any part thereof may be integrated into the processor 1202, for example, may be a cache and/or a general-purpose register.

The processor 1202 may perform the uplink transmission method in any one of the foregoing embodiments of this application. Specific content is not described herein again.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions are generated according to the embodiments of the disclosure. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, an (SSD), or the like.

Based on a same concept, this application provides a computer-readable storage medium. The computer-readable storage medium stores an instruction. When the instruction is run on a computer, the computer is enabled to perform the method steps related to the terminal in the embodiments of this application.

Based on a same concept, this application provides a computer-readable storage medium. The computer-readable storage medium stores an instruction. When the instruction is run on a computer, the computer is enabled to perform method steps related to a base station in the embodiments of this application.

Based on a same concept, this application provides a computer program product including an instruction. When the computer program product is run on a computer, the computer is enabled to perform the method steps related to the terminal in the embodiments of this application.

Based on a same concept, this application provides a computer program product including an instruction. When the computer program product is run on a computer, the computer is enabled to perform method steps related to a base station in the embodiments of this application.

A person skilled in the art may clearly know that mutual reference may be made between descriptions of the embodiments provided in the disclosure. For ease and brevity of description, for functions of apparatuses or devices provided in the embodiments of the disclosure and steps that are performed in the embodiments of the disclosure, refer to related descriptions in the method embodiments of the disclosure, and details are not described herein again.

A person skilled in the art should understand that the embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Definitely, a person skilled in the art can make various modifications and variations to this application without departing from the spirit and scope of this application. This application is intended to cover these modifications and variations of this application provided that the modifications and variations fall within the scope of the following claims and their equivalent technologies.

What is claimed is:

1. An uplink transmission method implemented by a terminal device, comprising:
   transmitting a scheduling request (SR) on a first uplink channel using a first transmit power, wherein the first uplink channel comprises a first time domain resource; and
   transmitting information on a second uplink channel using a second transmit power, wherein the second uplink channel comprises the first time domain resource, and wherein the first time domain resource represents some or all time domain resources in the second uplink channel, wherein:
   when the first time domain resource is the same as a time domain resource used for carrying a first demodulation reference signal (DMRS) on the second uplink channel:
      the first transmit power is greater than or equal to a third transmit power of the SR; and
      the second transmit power is a first difference between a total transmit power of the terminal device on the first time domain resource and the first transmit power;
   when the first time domain resource is the same as a time domain resource used for carrying a second DMRS on the second uplink channel:
      the second transmit power is the same as a fourth transmit power of the first DMRS; and
      the first transmit power is a second difference between the total transmit power of the terminal device on the first time domain resource and the second transmit power;
   when the first time domain resource is the same as a time domain resource used for carrying data on the second uplink channel, and a phase tracking reference signal (PT-RS) is further carried on the time domain resource used for carrying the data:
      the first transmit power is greater than or equal to the third transmit power; and
      the second transmit power is the first difference; and
   when the first time domain resource is the same as the time domain resource used for carrying the data on the second uplink channel, and the PT-RS is not carried on the time domain resource used for carrying the data:
      the second transmit power is the same as a fifth transmit power on a time domain resource used for carrying a DMRS on the second uplink channel; and
      the first transmit power is the second difference.

2. The uplink transmission method of claim 1, wherein a resource corresponding to the first time domain resource comprises one resource element or at least two consecutive resource elements.

3. The uplink transmission method of claim 1, wherein the second uplink channel is a physical uplink shared channel (PUSCH).

4. The uplink transmission method of claim 1, wherein both the first uplink channel and the second uplink channel are physical uplink control channels (PUCCH), wherein the uplink transmission method further comprises transmitting the information on the second uplink channel in a frequency hopping manner, and:
   obtaining the first transmit power and the second transmit power by allocating the total transmit power based on a ratio of an information amount of the SR to an information amount of uplink control information carried on the second uplink channel.

5. The uplink transmission method of claim 1, further comprising:
transmitting the SR on the first time domain resource when the second transmit power is less than the third transmit power of the second uplink channel; and
transmitting the information on the second uplink channel using the first time domain resource when the first transmit power is less than the fourth transmit power of the first uplink channel.

6. The uplink transmission method of claim 5, wherein after transmitting the SR, the uplink transmission method further comprises:
transmitting the information on the second uplink channel when time domain resources on which the second uplink channel is not transmitted or has been transmitted comprise time domain resources used for carrying a demodulation reference signal (DMRS) and uplink control information; and
setting the third transmit power for the second uplink channel as zero when time domain resources on which the second uplink channel is not transmitted or has been transmitted do not comprise the time domain resources used for carrying the DMRS and the uplink control information.

7. The uplink transmission method of claim 1, wherein a transmit power of the terminal device on a time domain resource in time domain resources occupied by the second uplink channel other than the first time domain resource is the same as the second transmit power or proportionally increases relative to the second transmit power.

8. An uplink transmission method implemented by a terminal device, comprising:
transmitting a scheduling request (SR) on a first uplink channel using a first transmit power, wherein the first uplink channel comprises a first time domain resource; and
transmitting information on a second uplink channel using a second transmit power, wherein the second uplink channel comprises the first time domain resource, wherein the first time domain resource represents some or all time domain resources in the second uplink channel, wherein both the first uplink channel and the second uplink channel are physical uplink control channels (PUCCH), and wherein:
when an orthogonal cover code (OCC) is used for the second uplink channel, and the first time domain resource is the same as a first start time domain resource used for the second uplink channel or a second start time domain resource used for the second uplink channel in frequency hopping:
the first transmit power is greater than or equal to a third transmit power of the SR; and
the second transmit power is a first difference between a total transmit power of the terminal device on the first time domain resource and the first transmit power;
when the OCC is used for the second uplink channel, and the first time domain resource is the same as a time domain resource after the first start time domain resource or a time domain resource after the second start time domain resource:
the second transmit power is the same as a transmit power of the terminal device on the first start time domain resource or the second start time domain resource; and the first transmit power is a second difference between the total transmit power of the terminal device on the first time domain resource and the second transmit power; and
when the OCC is not used for the second uplink channel:
the first transmit power is greater than or equal to the third transmit power; and
the second transmit power is the first difference.

9. An uplink transmission method implemented by a terminal device, comprising:
transmitting a scheduling request (SR) on a first uplink channel using a first transmit power, wherein the first uplink channel comprises a first time domain resource; and
transmitting information on a second uplink channel using a second transmit power, wherein the second uplink channel comprises the first time domain resource, wherein the first time domain resource represents some or all time domain resources in the second uplink channel, wherein both the first uplink channel and the second uplink channel are physical uplink control channels (PUCCH), wherein the uplink transmission method further comprises using an orthogonal cover code (OCC) for the second uplink channel, and wherein:
when the first time domain resource is the same as a first time domain resource used for the second uplink channel,
the first transmit power is greater than or equal to a third transmit power of the first uplink channel, and the second transmit power is a first difference between a total transmit power of the terminal device on the first time domain resource and the first transmit power; or
the second transmit power is greater than or equal to a fourth transmit power of the second uplink channel, and the first transmit power is a second difference between the total transmit power of the terminal device on the first time domain resource and the second transmit power; and
when the first time domain resource is the same as a time domain resource that is after the first time domain resource and that is used for the second uplink channel:
the second transmit power is the same as a fifth transmit power on the first time domain resource used for the second uplink channel; and
the first transmit power is the second difference.

10. An uplink transmission method implemented by a terminal device, comprising:
sending information using a first time domain resource and a first frequency domain resource, wherein the information comprises a demodulation reference signal (DMRS) and data and is carried on a physical uplink shared channel (PUSCH); and
sending a scheduling request (SR) using a second time domain resource and a second frequency domain resource, wherein the SR is carried on the PUSCH, wherein all or some time domain resources of the second time domain resource are the same as all or some time domain resources of the first time domain resource, wherein:
when a third time domain resource occupied by the data is the same as a fourth time domain resource occupied by the SR, resources corresponding to the third time domain resource or the fourth time domain resource comprise a first resource occupied by the data that is different from a second resource occupied by the SR, wherein a first frequency of the second resource is greater than or equal to a minimum frequency of the first resource, and wherein a second frequency of the second resource is less than or equal to a maximum frequency of the first resource.

11. The uplink transmission method of claim 10, wherein all or some frequency domain resources of the second frequency domain resource are the same as all or some frequency domain resources of the first frequency domain resource.

12. The uplink transmission method of claim 10, wherein when the second resource comprises a plurality of resource groups, an interval of at least one resource element exists between different resource groups, and wherein each of the resource groups comprises one resource element or at least two consecutive resource elements.

13. The uplink transmission method of claim 12, wherein adjacent resource groups on a time domain resource are located on different frequency domain resources.

14. The uplink transmission method of claim 12, wherein the information further comprises a phase tracking reference signal, and wherein a resource group is adjacent to a frequency domain resource used for the phase tracking reference signal.

15. A terminal device, comprising:
a memory configured to store instructions; and
a processor coupled to the memory, wherein the instructions cause the processor to be configured to:
  transmit a scheduling request (SR) on a first uplink channel using a first transmit power, wherein the first uplink channel comprises a first time domain resource; and
  transmit information on a second uplink channel using a second transmit power, wherein the second uplink channel comprises the first time domain resource, and wherein the first time domain resource represents some or all time domain resources in the second uplink channel, wherein:
    when the first time domain resource is the same as a time domain resource used for carrying a first demodulation reference signal (DMRS) on the second uplink channel:
      the first transmit power is greater than or equal to a third transmit power of the SR; and
      the second transmit power is a first difference between a total transmit power of the terminal device on the first time domain resource and the first transmit power;
    when the first time domain resource is the same as a time domain resource used for carrying a second DMRS on the second uplink channel:
      the second transmit power is the same as a fourth transmit power of the first DMRS; and
      the first transmit power is a second difference between the total transmit power of the terminal device on the first time domain resource and the second transmit power;
    when the first time domain resource is the same as a time domain resource used for carrying data on the second uplink channel, and a phase tracking reference signal (PT-RS) is further carried on the time domain resource used for carrying the data:
      the first transmit power is greater than or equal to the third transmit power; and
      the second transmit power is the first difference; and
    when the first time domain resource is the same as the time domain resource used for carrying the data on the second uplink channel, and the PT-RS is not carried on the time domain resource used for carrying the data:
      the second transmit power is the same as a fifth transmit power on a time domain resource used for carrying a DMRS on the second uplink channel; and
      the first transmit power is the second difference.

16. The terminal device of claim 15, wherein a resource corresponding to the first time domain resource comprises one resource element or at least two consecutive resource elements.

17. The terminal device of claim 15, wherein the second uplink channel is a physical uplink shared channel (PUSCH).

18. The terminal device of claim 15, wherein both the first uplink channel and the second uplink channel are physical uplink control channels (PUCCH), wherein the instructions further cause the processor to:
  transmit the information on the second uplink channel in a frequency hopping manner; and
  obtain the first transmit power and the second transmit power by allocating the total transmit power based on a ratio of an information amount of the SR to an information amount of uplink control information carried on the second uplink channel.

19. The terminal device of claim 15, wherein the instructions are further configured to cause the processor to:
  transmit the SR on the first time domain resource when the second transmit power is less than the third transmit power of the second uplink channel; and
  transmit the information on the second uplink channel using the first time domain resource when the first transmit power is less than the fourth transmit power of the first uplink channel.

20. The terminal device of claim 19, wherein the instructions are further configured to cause the processor to:
  transmit the information on the second uplink channel when time domain resources on which the second uplink channel is not transmitted or has been transmitted comprise time domain resources used for carrying a demodulation reference signal (DMRS) and uplink control information; and
  set the third transmit power for the second uplink channel as zero when time domain resources on which the second uplink channel is not transmitted or has been transmitted do not comprise the time domain resources used for carrying the DMRS and the uplink control information.

* * * * *